(12) United States Patent
Vijayaraghavan et al.

(10) Patent No.: US 11,860,889 B2
(45) Date of Patent: Jan. 2, 2024

(54) CASCADING DATA IMPACT VISUALIZATION TOOL

(71) Applicant: Capital One Services, LLC, McLean, VA (US)

(72) Inventors: Raghuram Vijayaraghavan, Little Elm, TX (US); Naga Chintala, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/397,007

(22) Filed: Aug. 9, 2021

(65) Prior Publication Data
US 2021/0365473 A1 Nov. 25, 2021

Related U.S. Application Data

(63) Continuation of application No. 16/733,889, filed on Jan. 3, 2020, now Pat. No. 11,100,128.

(51) Int. Cl.
*G06F 16/26* (2019.01)
*G06F 16/28* (2019.01)
*G06F 16/215* (2019.01)
*G06F 16/22* (2019.01)
*G06F 16/23* (2019.01)

(52) U.S. Cl.
CPC ............ *G06F 16/26* (2019.01); *G06F 16/215* (2019.01); *G06F 16/221* (2019.01); *G06F 16/2379* (2019.01); *G06F 16/288* (2019.01)

(58) Field of Classification Search
CPC .... G06F 16/26; G06F 16/221; G06F 16/2379; G06F 16/288
USPC ......................................................... 707/692
See application file for complete search history.

(56) References Cited

U.S. PATENT DOCUMENTS

| | | | |
|---|---|---|---|
| 7,870,016 B2 | 1/2011 | Fazal et al. | |
| 10,657,125 B1* | 5/2020 | Gautam | ............ G06F 16/24522 |
| 2014/0354650 A1* | 12/2014 | Singh | ........................ G06F 8/10 |
| | | | 345/440 |
| 2016/0321574 A1* | 11/2016 | Peterson | .............. G06Q 10/063 |
| 2017/0221237 A1* | 8/2017 | Pate | ....................... G06T 11/206 |
| 2019/0005104 A1* | 1/2019 | Prabhu | ................... G06Q 10/06 |

* cited by examiner

*Primary Examiner* — Joshua Bullock
(74) *Attorney, Agent, or Firm* — Banner & Witcoff, Ltd.

(57) ABSTRACT

Methods and systems described herein may retrieve a data lineage associated with a first computing system comprising a plurality of services and data elements. The data lineage may indicate a plurality of interrelationships between the plurality of services and data elements. Based on the data lineage, a visualization of the first computing system may be generated. Based on the one or more interrelationships between a first data element and the plurality of services and data elements, one or more services and data elements affected by the change to the first data element may be identified. Based on the one or more services and data elements affected by the change to the first data element, the visualization of the first computing system may be updated to indicate the impact to the first computing system.

20 Claims, 19 Drawing Sheets

| Source Column | | | | Target | | Target Column | | | | Role (optional) | |
|---|---|---|---|---|---|---|---|---|---|---|---|
| sourceName1 | sourceTypeK1 | key1 | sourcePlatformname1 | Type | targetName | targetTypeK1 | Key | target hostname | columnName1 | columnKey1 | ELT expression |
| NA | NA | NA | NA | | | | | | | | SF D2a to SF D2b |
| APPN_DIM | CCAF_TB | | COF-PROD-OTHER-DB_EAST | View | pl_ks_early_payof_fa | CCAF_TB | | COF-PROD-OTHER-DB_EAST | APPN_DM_ID | APPN_ID | https://github.bus.acme.com/data | nSF D2a to SF D2b |
| APPN_DIM | CCAF_TB | | COF-PROD-OTHER-DB_EAST | View | pl_ks_early_payof_fa | CCAF_TB | | COF-PROD-OTHER-DB_EAST | APPN_ID | APPN_ID | https://github.bus.acme.com/data | nSF D2a to SF D2b |
| APPN_DIM | CCAF_TB | | COF-PROD-OTHER-DB_EAST | View | pl_ks_early_payof_fa | CCAF_TB | | COF-PROD-OTHER-DB_EAST | DIR_ID | APPN_ID | https://github.bus.acme.com/data | nSF D2a to SF D2b |
| APPN_DIM | CCAF_TB | | COF-PROD-OTHER-DB_EAST | View | pl_ks_early_payof_fa | CCAF_TB | | COF-PROD-OTHER-DB_EAST | BUS_DT | APPN_ID | https://github.bus.acme.com/data | nSF D2a to SF D2b |
| APPN_DIM | CCAF_TB | | COF-PROD-OTHER-DB_EAST | View | pl_ks_early_payof_fa | CCAF_TB | | COF-PROD-OTHER-DB_EAST | BUS_TS | APPN_ID | https://github.bus.acme.com/data | nSF D2a to SF D2b |
| APPN_DIM | CCAF_TB | | COF-PROD-OTHER-DB_EAST | View | pl_ks_early_payof_fa | CCAF_TB | | COF-PROD-OTHER-DB_EAST | CCAF_PUBLN_ID | APPN_ID | https://github.bus.acme.com/data | nSF D2a to SF D2b |
| ACCT_TRXN_FACT | CCAF_TB | | COF-PROD-OTHER-DB_EAST | View | pl_ks_early_payof_fa | CCAF_TB | | COF-PROD-OTHER-DB_EAST | ACCT_DIM_ID | APPN_ID | https://github.bus.acme.com/data | nSF D2a to SF D2b |
| ACCT_TRXN_FACT | CCAF_TB | | COF-PROD-OTHER-DB_EAST | View | pl_ks_early_payof_fa | CCAF_TB | | COF-PROD-OTHER-DB_EAST | TRXN_PROCID_DT | APPN_ID | https://github.bus.acme.com/data | nSF D2a to SF D2b |
| ACCT_TRXN_FACT | CCAF_TB | | COF-PROD-OTHER-DB_EAST | View | pl_ks_early_payof_fa | CCAF_TB | | COF-PROD-OTHER-DB_EAST | ACTN_CD | APPN_ID | https://github.bus.acme.com/data | nSF D2a to SF D2b |
| ACCT_TRXN_FACT | CCAF_TB | | COF-PROD-OTHER-DB_EAST | View | pl_ks_early_payof_fa | CCAF_TB | | COF-PROD-OTHER-DB_EAST | TRXN_CD | APPN_ID | https://github.bus.acme.com/data | nSF D2a to SF D2b |
| ACCT_TRXN_FACT | CCAF_TB | | COF-PROD-OTHER-DB_EAST | View | pl_ks_early_payof_fa | CCAF_TB | | COF-PROD-OTHER-DB_EAST | TRXN_DESC_CD | APPN_ID | https://github.bus.acme.com/data | nSF D2a to SF D2b |
| ACCT_TRXN_FACT | CCAF_TB | | COF-PROD-OTHER-DB_EAST | View | pl_ks_early_payof_fa | CCAF_TB | | COF-PROD-OTHER-DB_EAST | BUS_DT | APPN_ID | https://github.bus.acme.com/data | nSF D2a to SF D2b |
| ACCT_TRXN_FACT | CCAF_TB | | COF-PROD-OTHER-DB_EAST | View | pl_ks_early_payof_fa | CCAF_TB | | COF-PROD-OTHER-DB_EAST | BUS_TS | APPN_ID | https://github.bus.acme.com/data | nSF D2a to SF D2b |
| PL_KS_EARLY_PAYOF_FACT | CCAF_TB | | COF-PROD-OTHER-DB_EAST | View | pl_ks_early_payof_fa | CCAF_TB | | COF-PROD-OTHER-DB_EAST | CCAF_PUBLN_ID | APPN_ID | https://github.bus.acme.com/data | nSF D2a to SF D2b |
| ACCT_LOAN_DIM | CCAF_TB | | COF-PROD-OTHER-DB_EAST | View | pl_ks_early_payof_fa | CCAF_TB | | COF-PROD-OTHER-DB_EAST | LAST_TRXN_DT | APPN_ID | https://github.bus.acme.com/data | nSF D2a to SF D2b |
| ACCT_LOAN_DIM | CCAF_TB | | COF-PROD-OTHER-DB_EAST | View | pl_ks_early_payof_fa | CCAF_TB | | COF-PROD-OTHER-DB_EAST | ACCT_DIM_ID | APPN_ID | https://github.bus.acme.com/data | nSF D2a to SF D2b |
| ACCT_LOAN_DIM | CCAF_TB | | COF-PROD-OTHER-DB_EAST | View | pl_ks_early_payof_fa | CCAF_TB | | COF-PROD-OTHER-DB_EAST | LOANCUST | APPN_ID | https://github.bus.acme.com/data | nSF D2a to SF D2b |
| ACCT_LOAN_DIM | CCAF_TB | | COF-PROD-OTHER-DB_EAST | View | pl_ks_early_payof_fa | CCAF_TB | | COF-PROD-OTHER-DB_EAST | BANK | APPN_ID | https://github.bus.acme.com/data | nSF D2a to SF D2b |
| ACCT_LOAN_DIM | CCAF_TB | | COF-PROD-OTHER-DB_EAST | View | pl_ks_early_payof_fa | CCAF_TB | | COF-PROD-OTHER-DB_EAST | BRANCH | APPN_ID | https://github.bus.acme.com/data | nSF D2a to SF D2b |
| ACCT_LOAN_DIM | CCAF_TB | | COF-PROD-OTHER-DB_EAST | View | pl_ks_early_payof_fa | CCAF_TB | | COF-PROD-OTHER-DB_EAST | MBR | APPN_ID | https://github.bus.acme.com/data | nSF D2a to SF D2b |
| ACCT_LOAN_DIM | CCAF_TB | | COF-PROD-OTHER-DB_EAST | View | pl_ks_early_payof_fa | CCAF_TB | | COF-PROD-OTHER-DB_EAST | BUS_DT | APPN_ID | https://github.bus.acme.com/data | nSF D2a to SF D2b |
| ACCT_LOAN_DIM | CCAF_TB | | COF-PROD-OTHER-DB_EAST | View | pl_ks_early_payof_fa | CCAF_TB | | COF-PROD-OTHER-DB_EAST | BUS_TS | APPN_ID | https://github.bus.acme.com/data | nSF D2a to SF D2b |
| ACCT_LOAN_DIM | CCAF_TB | | COF-PROD-OTHER-DB_EAST | View | pl_ks_early_payof_fa | CCAF_TB | | COF-PROD-OTHER-DB_EAST | CCAF_PUBLN_ID | APPN_ID | https://github.bus.acme.com/data | nSF D2a to SF D2b |

DESCRIBE TABLE "COAF_DB_COLLAB"."LAB_LS"."LS_DATA_LINEAGE"

ts Data Preview query ID  SQL   89ms   12 rows   [Copy]

result...

| Row | name | type | kind | null? | default | primary key |
|---|---|---|---|---|---|---|
| 1 | EXP_NM | VARCHAR(50) | COLUMN | Y | NULL | N |
| 2 | TBL_RPT_NM | VARCHAR(100) | COLUMN | Y | NULL | N |
| 3 | D2B_TBL_NM | VARCHAR(30000) | COLUMN | Y | NULL | N |
| 4 | D2B_COL_NM | VARCHAR(15000) | COLUMN | Y | NULL | N |
| 5 | D2A_TBL_NM | VARCHAR(30000) | COLUMN | Y | NULL | N |
| 6 | D2A_COL_NM | VARCHAR(15000) | COLUMN | Y | NULL | N |
| 7 | D1_TBL_NM | VARCHAR(15000) | COLUMN | Y | NULL | N |
| 8 | D1_COL_NM | VARCHAR(15000) | COLUMN | Y | NULL | N |
| 9 | L1_S3_PATH | VARCHAR(500) | COLUMN | Y | NULL | N |
| 10 | L0_S3_PATH | VARCHAR(16777216) | COLUMN | Y | NULL | N |
| 11 | SRC_SYS_NM | VARCHAR(72) | COLUMN | Y | NULL | N |
| 12 | D2A_EXT_USAGE | VARCHAR(16777216) | COLUMN | Y | NULL | N |

FIG. 16

```
create or replace TABLE LS_DATA_LINEAGE (
    EXP_NM VARCHAR(50),
    TBL_RPT_NM VARCHAR(100),
    D2B_TBL_NM VARCHAR(30000),
    D2B_COL_NM VARCHAR(15000),
    D2A_TBL_NM VARCHAR(30000),
    D2A_COL_NM VARCHAR(15000),
    D1_TBL_NM VARCHAR(15000),
    D1_COL_NM VARCHAR(150000),
    L1_S3_PATH VARCHAR(500),
    L0_S3_PATH VARCHAR(16777216),
    SRC_SYS_NM VARCHAR(72),
    D2A_EXT_USAGE VARCHAR(16777216)
)
```

CASCADING DATA IMPACT VISUALIZATION TOOL

This application is a continuation of U.S. patent application Ser. No. 16/733,889 entitled "Cascading Data Impact Visualization Tool" and filed on Jan. 3, 2020 which is incorporated by reference herein in its entirety.

FIELD OF USE

Aspects described herein generally relate to computer databases, and hardware and software related thereto. More specifically, one or more aspects describe herein provide determination and visualization of impact of data change across databases.

BACKGROUND

Cloud computing combines hardware, software and networking into a subscription or usage-based service model. Cloud computing services may be implemented via a global network of secure datacenters that may provide resources such as, servers, storage, databases, and software over the Internet ("the cloud"), The datacenters tend to be upgraded regularly to the latest hardware and software and may therefore, lower operating costs of purchasing and managing hardware and software for users of these services. Migrating to the cloud refers to the process of moving data, applications, or business files to a cloud computing environment. When individuals or businesses migrate or transition to the cloud, they are switching from on-premises physical hardware or software to a cloud-based infrastructure-as-a-service or software-as-a-service.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

When individuals or businesses migrate or transition to the cloud, data resources such as existing business object reports and databases may be ported to cloud compatible applications, such as Tableau and Snowflake. Tracking data flow across the various data resources may be challenging since the interrelationships and dependencies between the data resources may span across multiple levels of linked data and databases. However, accurate tracking of data flows across data resources is important for assessing and managing an impact of a data change to one or more of the data resources. The data resources associated with a business application or service may comprise a collection of tables and reports generated based on one or more data in the collection of tables. As an example of a data change, a customer information table may include both the first and last names of customers in a single customer name column. A user developer of the business application or service may wish to modify the customer information table so that the first and last names are located in two separate columns, for example a customer first name column and a customer last name column. Prior to implementing the modification, the user developer may wish to know an impact of the proposed modification on other data resources that may depend on the existing customer name column. For example, a downstream data resource, such as a report or table, may directly or indirectly reference the existing customer name column. If the downstream data resource is not updated to support the proposed modification, then the downstream data resource may fail. However, determining the cause of the failure to the downstream data resource may be challenging without a means for accurately tracking data flow across resources. Tracking the cause of the failure may result in an unnecessary loss of time, and resources. Such a failure may impact business users and result in unnecessary downtime and inconvenience.

Systems and methods described herein consolidate data lineage documents for data resources associated with a business application or service and provide a graphical view of the interrelationships between the data resources. Referring to the example above, the interrelationships may indicate the reports, tables and/or data resources referencing the customer name column of the customer information table. The dependencies may indicate that a customer address table relies on the customer name column of the customer information table. The dependencies may also indicate that a customer transactions table relies on the customer name column of the customer information table. Thus, both the customer address table and the customer transactions table may need to be updated to handle the proposed modification to the customer name column. Otherwise, the impact of the modification may not be determined until downstream data resources relying on the customer transactions table and the customer address table fail. Implementations allow an impact of changes to data resources at various levels to be identified and brought to the attention of key stake holders in order to make informed decisions. Implementations allow users/support teams to quickly determine an impact of data changes and communicate associated delays to relevant business users and development teams. Accordingly, the quality, efficiency, and speed with which data resources updated and modified are improved. These features, along with many others, are discussed in greater detail below.

Methods and systems as described herein may include a computer-implemented method that includes retrieving a data lineage associated with a first computing system comprising a plurality of services and data elements. The data lineage may indicate a plurality of interrelationships between the plurality of services and data elements. The method may include generating, based on the data lineage, a visualization of the first computing system, receiving a user request to visualize, based on a change to a first data element, an impact to the first computing system, and determining, based on the data lineage, one or more interrelationships between the first data element and the plurality of services and data elements. The method may also include determining, based on the one or more interrelationships between the first data element and the plurality of services and data elements, one or more services and data elements affected by the change to the first data element, and updating, based on the one or more services and data elements affected by the change to the first data element, the visualization of the first computing system to indicate the impact to the first computing system.

Methods and systems as described herein may include an apparatus that includes one or more processors, and memory storing instructions that, when executed by the one or more processors, cause the apparatus to retrieve a data lineage associated with a first computing system comprising a plurality of tables that each comprise one or more columns.

The data lineage may indicate a plurality of interrelationships between the plurality of tables, generate, based on the data lineage, a visualization of the first computing system, receive a user request to visualize, based on a change to data in a column of a first table, an impact to the first computing system, determine, based on the data lineage, one or more interrelationships between the column of the first table and the plurality of tables, determine, based on the one or more interrelationships between the column of the first table and the plurality of tables, one or more tables affected by the change to the column of the first table, and update, based on the one or more tables affected by the change to the column of the first table, the visualization of the first computing system to indicate the impact to the first computing system of the change to the column of the first table.

Methods and systems as described herein may include a non-transitory machine-readable medium storing instructions that, when executed by one or more processors, cause the one or more processors to perform steps that include retrieving a data lineage associated with a first computing system comprising a plurality of services and data elements. The data lineage may indicate a plurality of interrelationships between the plurality of services and data elements, and the services and data elements may include a plurality of tables that each comprise one or more columns. The instructions may cause the one or more processors to also perform the steps of generating, based on the data lineage, a visualization of the first computing system, and receiving a user request to visualize, based on a change to a first data element, an impact to the first computing system. The change to the first data element may represent a corruption of the first data element, unavailability of the first data element, or a proposed modification to the first data element, and the first data element may correspond to a column of a first table. The steps may include determining, based on the data lineage, one or more interrelationships between the first data element and the plurality of services and data elements, and determining, based on the one or more interrelationships between the first data element and the plurality of services and data elements, one or more services and data elements affected by the change to the first data element. Each of a plurality of tables of the one or more services and data elements affected by the change to the first data element may directly or indirectly reference the column of the first table. The steps may include updating, based on the one or more services and data elements affected by the change to the first data element, the visualization of the first computing system to indicate the impact to the first computing system by: determining one or more interrelationships between the first data element and the one or more services and data elements affected by the change to the first data element, displaying the first data element and the one or more services and data elements affected by the change to the first data element, and displaying the one or more interrelationships between the first data element and the one or more services and data elements affected by the change to the first data element. The steps may include sending a notification to one or more users associated with the one or more services and data elements affected by the change to the first data element. The one or more services and data elements affected by the change to the first data element may be associated with one or more business applications.

BRIEF DESCRIPTION OF THE DRAWINGS

The present disclosure is described by way of example and not limited in the accompanying figures in which like reference numerals indicate similar elements and in which:

FIG. 14 shows an example of a data lineage document;

FIG. 15 shows a result of processing a data lineage document; and

FIG. 16 shows another result of processing a data lineage.

FIG. 17 shows art example routine for that may be utilized for generating a data lineage based on information in a data lineage document.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Figure 1:
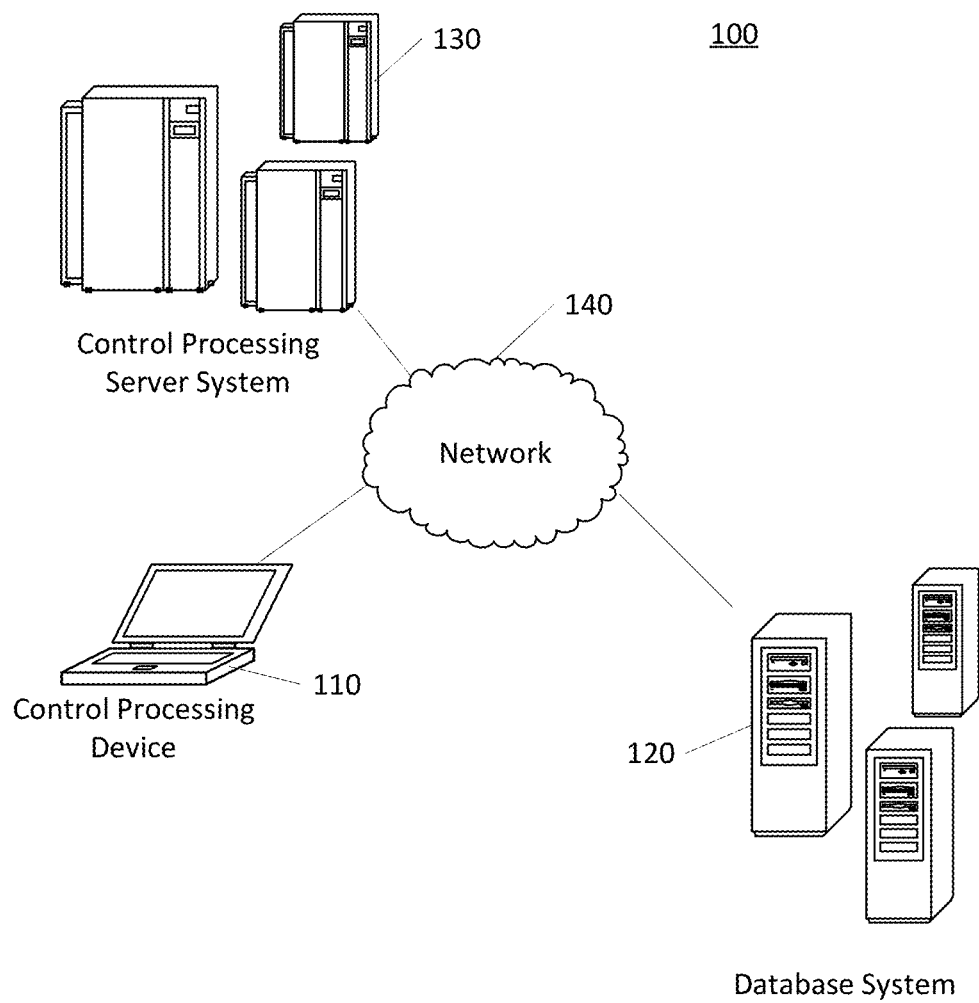
FIG. 1 shows an example of a control processing system in which one or more aspects described herein may be implemented.

FIG. 1 shows a system 100. The system 100 may include at least one client device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client device 110 may access server applications and/or resources using one or more client applications (not shown) as described herein. Client device 110 may be a mobile device, such as a laptop, smart phone, or tablet, or computing devices, such as a desktop computer or a server. Alternatively, client device 110 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 120 may be configured to maintain, store, retrieve, and update information for server system 130. Further, database system may provide server system 130 with information periodically or upon request. In this regard, database system 120 may be a distributed database capable of storing, maintaining, and updating large volumes of data across clusters of nodes. Database system 120 may provide a variety of databases including, but not limited to, relational databases, hierarchical databases, distributed databases, in-memory databases, flat file databases, XML databases, NoSQL databases, graph databases, and/or a combination thereof.

Server system 130 may be configured with a server application (not shown) that is capable of interfacing with client application and database system 120 as described herein. In this regard, server system 130 may be a stand-alone server, a corporate server, or a server located in a server farm or cloud-computer environment. According to some examples, server system 130 may be a virtual server hosted on hardware capable of supporting a plurality of virtual servers.

Network 140 may include any type of network. For example, network 140 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
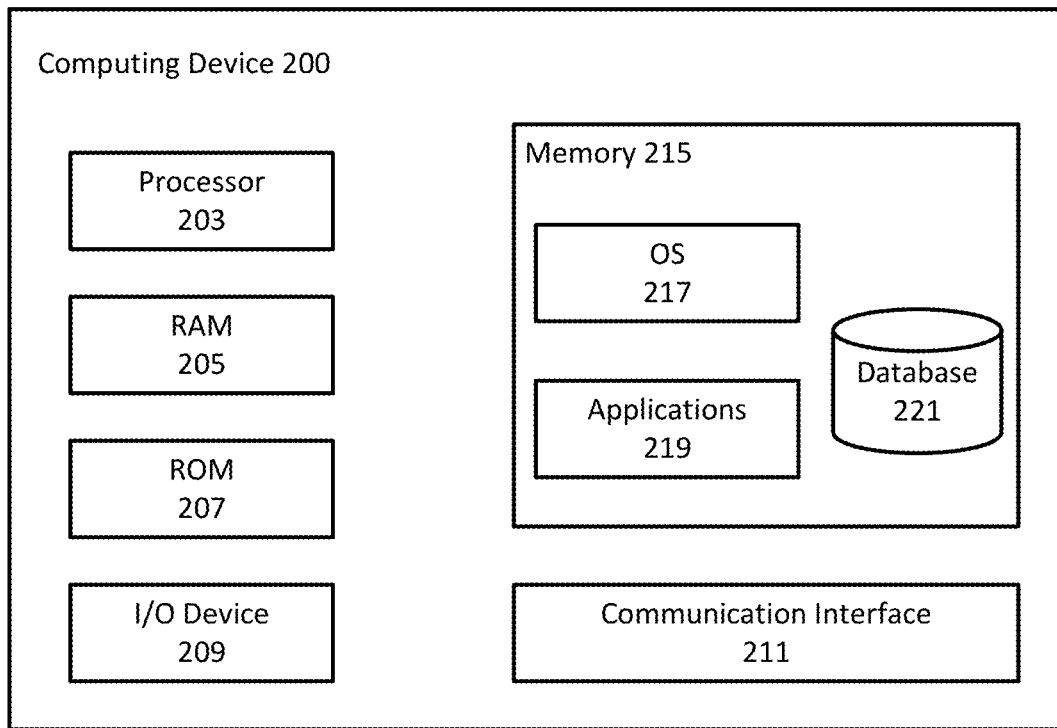
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
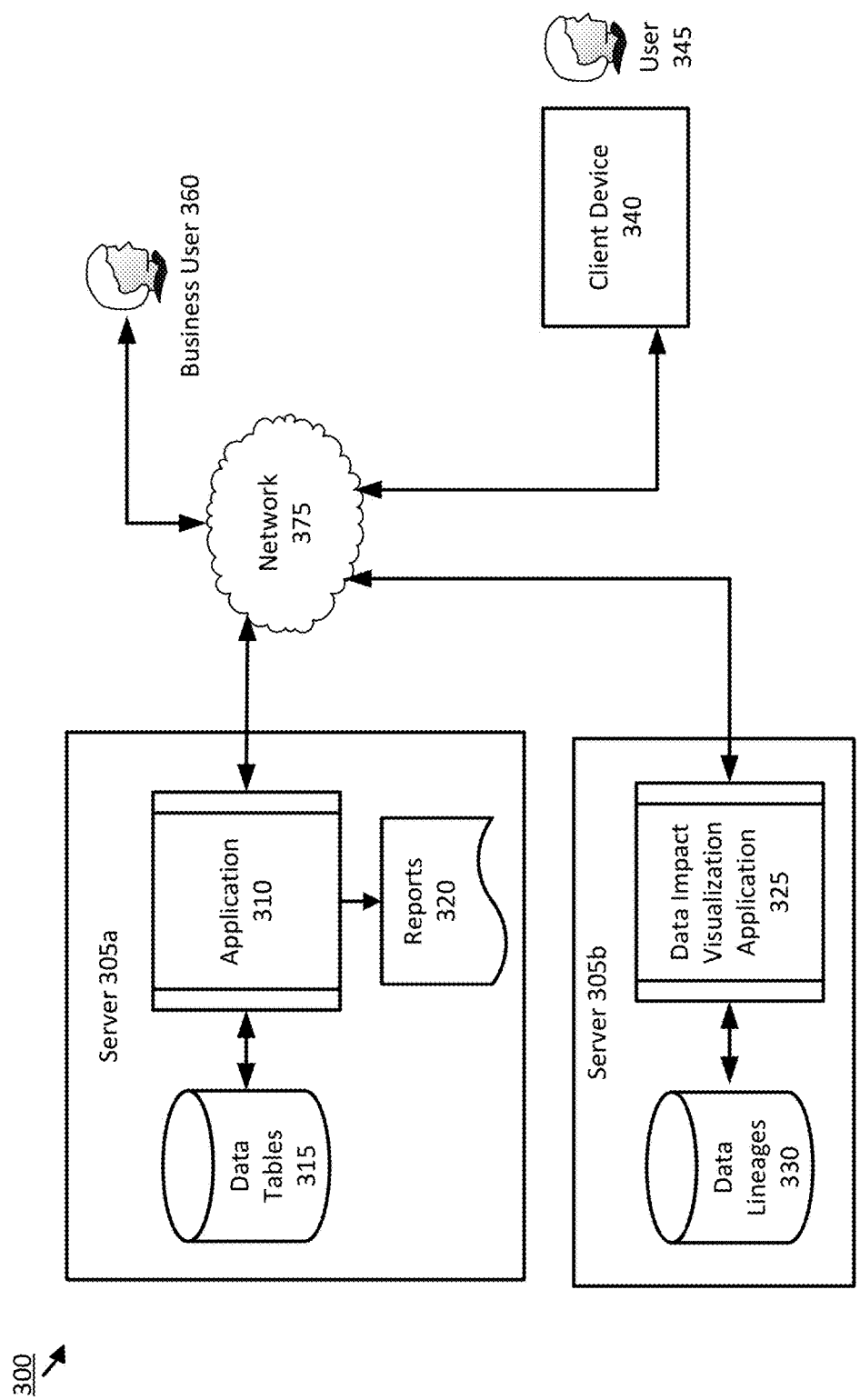
FIG. 3 shows an example system for providing a cascading data impact visualization tool.

FIG. 3 shows an example system 300 for providing a cascading data impact visualization tool according to one or more aspects of the disclosure. The system 300 may comprise a first server 305. The first server 305a may be a computing device, such as the computing device 200 shown in FIG. 2. The first server 305a may comprise a memory, such as the memory 215 of the computing device 200 shown in FIG. 2. The memory of the first server 305a may comprise one or more applications 310, such as the applications 219 of the computing device 200 in FIG. 2. The applications 310 may provide one or more business applications and/or services to one or more business users 360. A plurality of data resources may be associated with each of the applications 310. The data resources may comprise a collection of data tables 315 stored in a database, such as the database 221 of the computing device 200 shown in FIG. 2. The data tables 315 may comprise one or more table columns and data elements. The data resources may also comprise one or more reports 320. The reports 320 may be generated by the applications 310 based on the data tables 315. The reports 320 may be generated using a reporting tool (e.g., Tableau®) and may comprise, for example, charts, graphs, and other analytic tools for visualizing the data tables 315. The applications 310 may provide the reports 320 to the one or more business users 360, a user developer, such as the user 345, or other data resources via network 375.

The data tables 315 may be related to each other by specific fields (e.g., table columns, cells, and data elements). As an example, the data tables 315 may include a customer information table comprising a plurality of columns with customer information, such as customer ID numbers, first names of customers and last names of customers. A first column may comprise the customer ID numbers, a second column may comprise the first names of the customers associated with customer ID numbers in the first column, and a third column may comprise the last names of the customers associated with the customer ID numbers in the first column. The data tables 315 may also include a customer address table. A first column of the customer address table may comprise customer ID numbers and a second column may comprise the addresses of the customers associated with the customer ID numbers in the first column. Thus, the customer ID numbers column is a related field between the customer information table and the customer address table. One or more of the data tables 315 may be joined by combining the related data on common fields (e.g., columns). For example, the customer address table may be joined with the customer information table on the common customer ID numbers table columns. The common fields (e.g., table columns) that the tables are joined on may have the same data type. The join of the tables may break if the data type of the common fields (e.g., table columns) is changed after the tables are joined.

One or more data lineages may be determined for the data resources, such as the data tables 315 and the reports 320. The data lineages may be based on the interrelationships and dependencies among the data resources. As discussed above, one or more of the data tables 315 may be related by specific fields (e.g., table columns) Additionally, the reports 320 may be generated based on one or more of the data tables 315. The data lineage(s) of a table column may indicate where the data of the table column originates from and the downstream dependencies of that table column. Thus, the data lineage for a data resource may indicate the interrelationships between the data resource and other data resources. In the example above, the related field (e.g., table column) between the customer information table and the customer address table is the customer ID numbers column. Thus, a data lineage for the customer ID numbers column in the customer address table may indicate a relationship with the customer ID numbers column in the customer information table. A data lineage for a data resource may also track a flow of data from a source to the data resource (e.g., a target or destination). For example, the data lineage of a table column may track the flow of data from the table column (e.g., source) to a target, such as a report. An original source may be a table column that is referenced by other resources but does not reference the data of any other resource. The target may be a data resource that consumes the data in the table column, for example another table column or a report.

Figure 4:
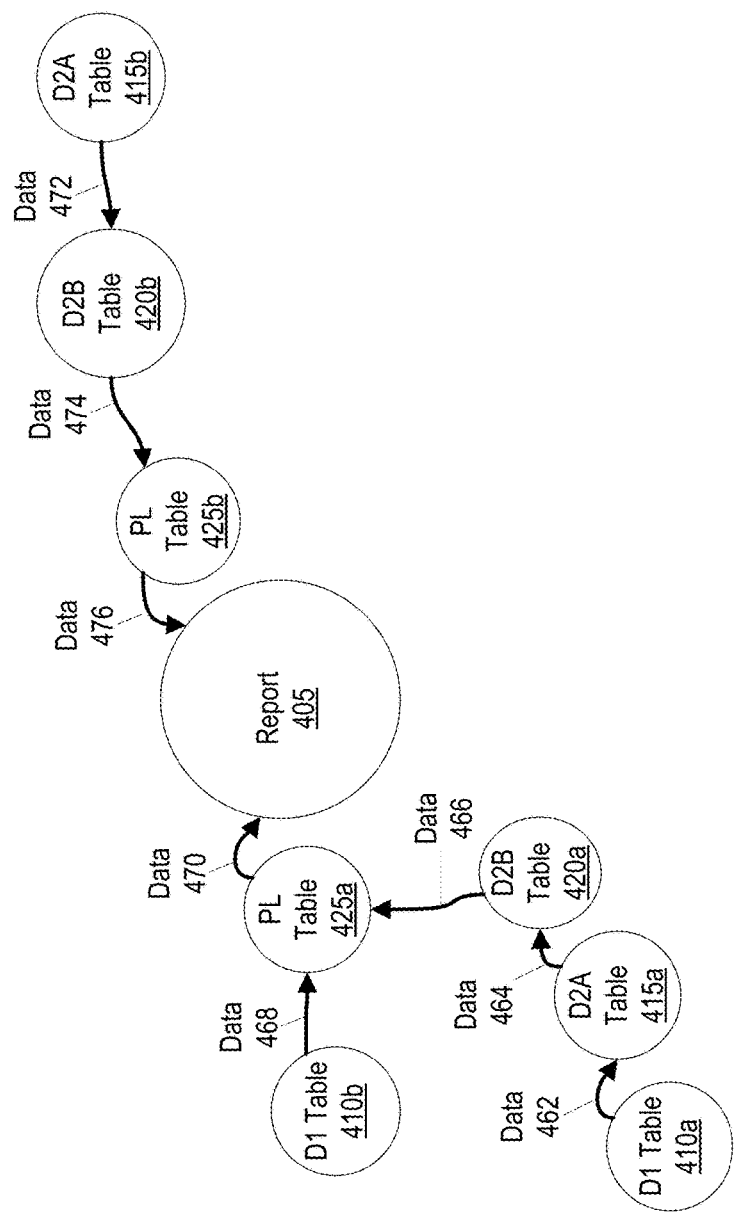
FIG. 4 shows example data lineages.

FIG. 4 shows three data lineages for a report 405 associated with a business service or application. The data lineages for the report 405 may track a flow of data (or interrelationships between data) from one or more original source data resources to the report 405 (e.g., target or destination). The data resources indicated by the data lineages may be associated with different levels of a database, for example levels D1, D2A, D2B, etc. As shown in FIG. 4, the first data lineage of the target report 405 may comprise two tables at a D1 level of a database, such as a first D1 table 410a and a second D1 table 410b. The second data lineage may comprise two tables at a D2A level of the database, such as a first D2A table 415a and a second D2A table 415b. The third data lineage may comprise two tables in a D2B level of the database, such as a first D2B table 420a and a second D2B table 420b. Additionally, the data lineages may also comprise data in a first PL table 425a and a second PL table 425b.

The first data lineage may track the flow of data from an original source D1 table 410a to the report 405 as: (D1 table 410a)→(D2A table 415a)→(D2B 420a)→(PL table 425a) →(report 405). One or more original source data 462 in the D1 table 410*a* may be referenced or utilized by the D2A table 415*a*. For example, a column in the D1 table 410*a* may be referenced by a column in the D2A table 415*a*. As another example, the values of a column in the D2A table 415*a* may be generated based on data in a column of the D1 table 410*a*. The first data lineage also indicates that a dependency between the D2A table 415*a* and the D2B table 420*a*. For example, one or more data 464 in the D2A table 415*a* may be referenced or utilized by the D2B table 420*a*. The first data lineage also indicates the one or more data 466 in the D2B table 420*a* may be referenced or utilized by the PL table 425*a*. Finally, the data lineage indicates that the report 405 may be generated based on data 470 in the PL table 425*a*. For example, the data in the first and second PL tables 425*a* and 425*b* may be associated with one or more wrappers for Procedural Language extensions to SQL (PL/SQL) source code. The second data lineage for the report 405 may track the flow of data from an original source D1 table 410*b* to the report 405 as: (D1 table 410*b*)→(PL table 425*a*)→ (report 405). The third data lineage for the report 405 may track the flow of data from an original source D2A table 410*b* to the report 405 as: (D2A table 415*b*)→(D2B table 420*b*)→(PL table 425*b*)→(report 405). For example, one or more original source data 472 in the D2A table 415*b* may be referenced or utilized by the D2B table 420*b*. The third data lineage also indicates that one or more data 474 in the D2B table 420*b* may be referenced or utilized by PL table 425*b*. The third data lineage also indicates that the report 405 may be generated based on one or more data 476 in the PL table 425*a*.

The data lineage of a data resource may track a flow of data at a table or column level. For example, a column level data lineage may indicate the data resources at the column level as: L0 [S3]↔L1↔D1 Table D2A Table↔D2B Table/ PL↔Table Tableau Report. L0[S3] may be a data element S3 within a column L0 in a D1 Table. L0[S3] may be referenced by a column L1 in the D1 Table. The L1 column may be referenced by a D2A Table. The D2A Table may be referenced by a D2B Table and a PL Table. The D2B Table and the PL Table may be utilized to generate a Tableau Report.

Referring back to FIG. 3, the system 300 may comprise a second server 305*b*. The second server 305*b* may be a computing device, such as the computing device 200 shown in FIG. 2. The second server 305*b* may comprise a memory, such as the memory 215 shown in FIG. 2. The memory of the second server 305*a* may comprise a data impact visualization application 325 that may be configured to determine and/or generate a visualization of data or resources associated with one or more business services and/or applications based on data lineages 330 associated with the data tables 315 and stored in a database, such as the database 221 shown in FIG. 2. The data impact visualization application 325 may also be configured to provide a user interface (UI) that may be displayed on a display of a client device 340 for a user 345. The client device 340 may be a computing device, such as the computing device 200 shown in FIG. 2.

Figure 5:
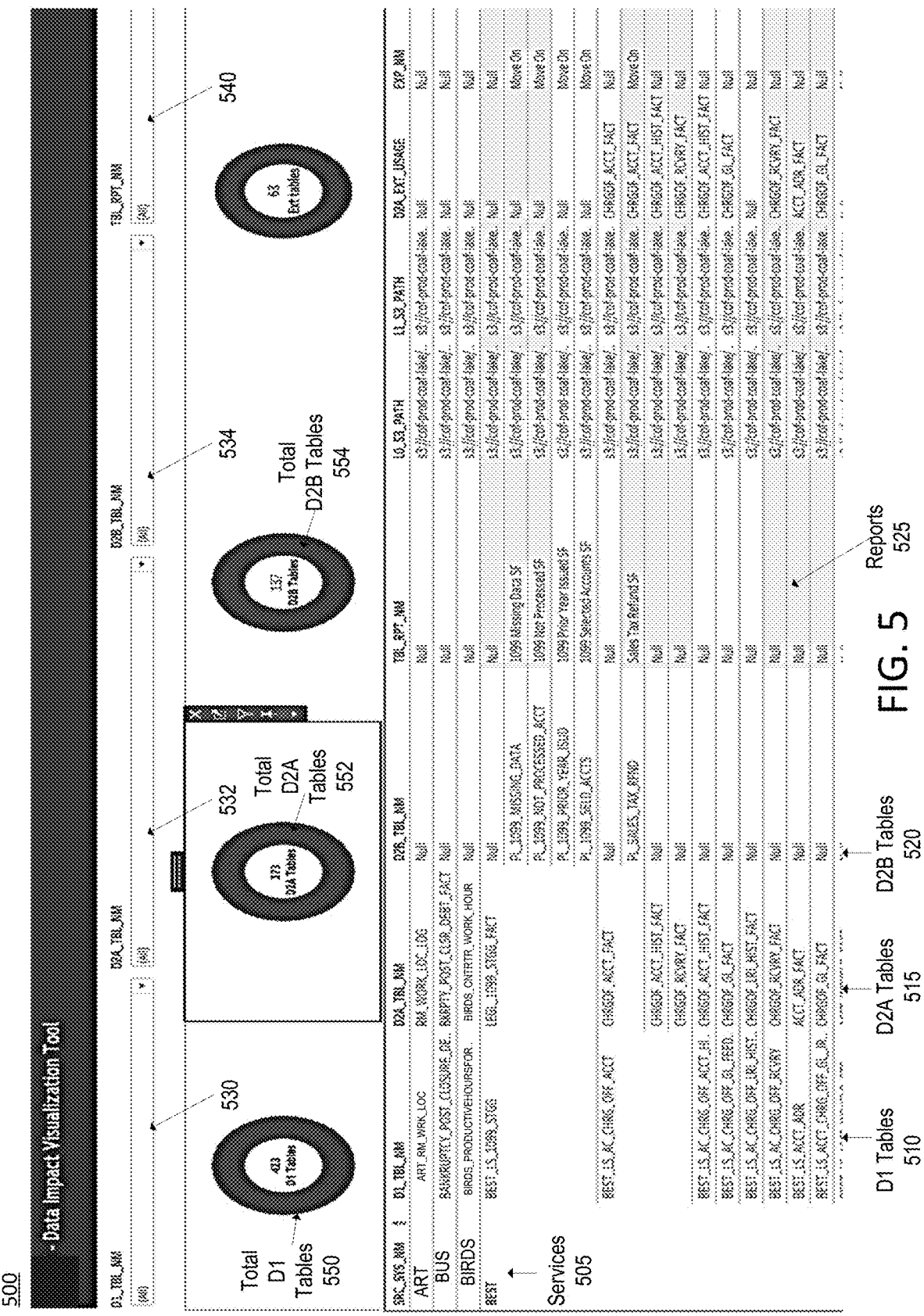
FIG. 5 shows an example user interface of a cascading data impact visualization tool.

FIG. 5 shows an example of a user interface 500 that may be provided by the data impact visualization application 325. The user interface 500 may display a visualization of one or more business applications and/or services provided by the applications 310 in FIG. 3. The visualization may indicate data resources and interrelationships between the data resources. As shown in FIG. 5, the visualization may indicate the names of the one or more business applications and/or services (services 505), such as "Art," "Bus," "Birds," and "Best." The visualization may indicate the data tables 315 and reports 320 that are associated with each of the services 505, for example, the D1 tables 510, the D2A tables 515, the D2B tables 520, and the reports 525.

The visualization may indicate the interrelationships between the D1 tables 510, the D2A tables 515, the D2B tables 520, and the reports 525 for each of the services 505. As an example, the data resources associated with the service "Art" include a D1 table 510, ART_RM_WRK_LOC, and a D2A table 515, RM_WORK_LOC_LOG. This may indicate that one or more original source data in the ART_RM_WRK_LOC table may be referenced by the D2A table 515, RM_WORK_LOC_LOG. No other data resources for the service "Art" directly or indirectly reference the D1 table 510, ART_RM_WRK_LOC, or the D2A table 515, RM_WORK_LOC_LOG.

As another example, the data resources associated with the service "Best" include several D1 tables 510 such as BEST_LS_1099_STGG, BEST_LS_AC_CHRG_OFF_ACCT, BEST_LS_AC_CHRG_OFF_ACCT_HI, BEST_LS_AC_CHRG_GL_FEED, BEST_LS_AC_CHRG_OFF_LRI_HIST, BEST_LS_AC_CHRG_OFF_RCVRY, BEST_LS_ACCT_ADR, and BEST_LS_ACCT_CHRG_OFF_GL_JR ("Best" D1 tables 510). One or more original source data in each of the "Best" D1 tables 510 may be referenced by one or more D2A tables 515. For example, one or more original source data in the "Best" D1 table 510, BEST_LS_1099_STGG, may be referenced by the D2A table LEGL_1099_STGG_FACT. One or more original source data in another "Best" D1 table 510, BEST_LS_AC_CHRG_OFF_ACCT, may be referenced by at least three of the D2A tables, such as CHRGOF_ACCT_FACT, CHRGOF_ACCT_HIST_FACT, and CHRGOF_RCVRY_FACT. One or more of the D2A tables 515 may be referenced by one or more of the D2B tables 520. For example, one or more data in the D2A table 515, CHRGOF_ACCT_FACT, may be referenced by the D2B table 520, PL_SALES_TAX_RFND. One or more reports 525 associated with the service "Best" may be generated based on the D2B tables 520. For example, a report 520, Sales Tax Refund SF, may be generated based on the D2B table 520, PL_SALES_TAX_RFND. Thus, one of the data lineages or flow of data for the report 520 associated with the service "Best" may be indicated as: (BEST_LS_AC_CHRG_OFF_ACCT)→ (CHRGOF_ACCT_FACT)→(PL_SALES_TAX_RFND)→ (Sales Tax Refund SF).

The user interface 500 may provide one or more pull-down menus for selecting one or more of the D1 tables 510, the D2A tables 515, the D2B tables 520, and the reports 525. For example, one of the D1 tables 510 may be selected via a D1_TB_NM pull-down menu 530, one of the D2A tables may be selected via a D2A_TB_NM pull-down menu 532, one of the D2B tables may be selected via a D2A_TB_NM pull-down menu 532, and one of the reports 525 may be selected via a TBL_RPT_NM pull-down menu 540.

The user interface 500 may display various statistics related to the displayed visualization, such as a total number of the D1 tables 510, the D2A tables 515, the D2B tables 520, and the reports 525 associated with the displayed services 505. For example, the user interface 500 may comprise a first graphic, image, or icon 550 indicating that there are 423 D1 tables 510 associated with the services 505. A second graphic, image, or icon 552 may indicate that there are 373 D2A tables 515 associated with the services 505. A third graphic, image, or icon 554 may indicate that there are 137 D2B tables 520. The total number of the D1 tables 510, the D2A tables 515, the D2B tables 520, and the reports 525 associated with the displayed services 505 may be updated based on changes to the displayed visualization. For example, filtering based on a table, column, or report name may update the visualization and thus, the number of data resources indicated by the graphics 550, 552 and 554.

Figure 6:
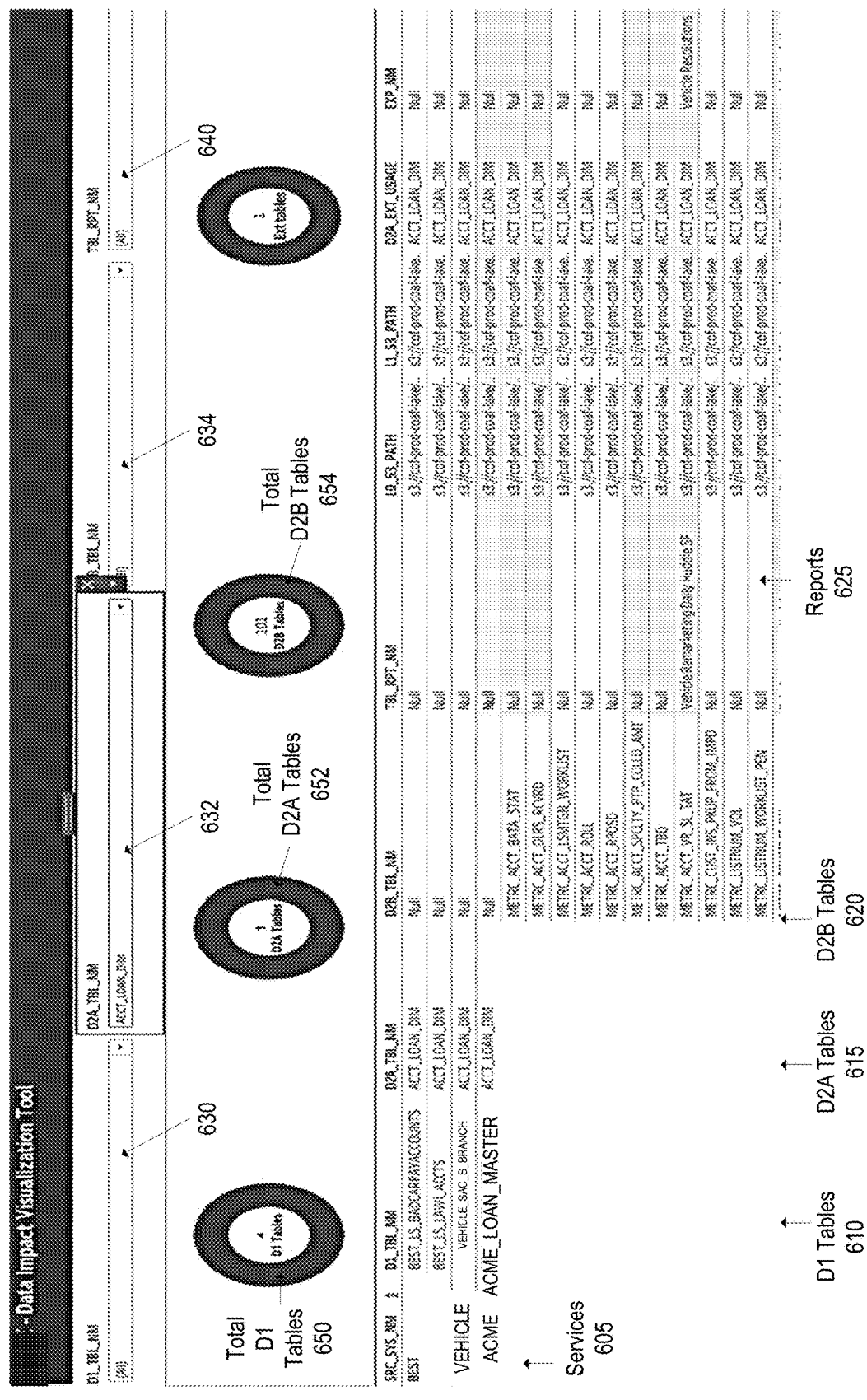
FIG. 6 shows an example of table level filtering in a user interface of the cascading data impact visualization tool.

The visualization of data displayed in the user interface 500 may be updated based on a user selection of one or more of the D1 tables 510, the D2A tables 515, the D2B tables 520, and the reports 525. As discussed above, the user interface 500 may provide pull-down menus for selecting one or more of the D1 tables 510, the D2A tables 515, the D2B tables 520, and the reports 525. FIG. 6 shows a result of table level filtering within a user interface 600. The user interface 600 may provide one or more pull-down menus 630, 632, 634, and 640, for selecting respectively one or more of the D1 tables 610, the D2A tables 615, the D2B tables 620, and the reports 625.

The user interface 600 shows a result of selecting a D2A table "ACCT_LOAN_DIM," via the D2A_TBL_NM pull-down menu 632. The data in the user interface 600 may be filtered based on the interrelationships between "ACCT_LOAN_DIM" table and other data resources. For example, the D1 tables 610 may be updated to show the names of tables that are directly or indirectly referenced by the "ACCT_LOAN_DIM" table. The D2B tables 620 may be updated to show the name of tables that directly or indirectly reference one or more data in the "ACCT_LOAN_DIM" table. The reports 625 may be updated to show the names of reports that directly or indirectly reference one or more data in the "ACCT_LOAN_DIM" table. For example, for the business application or service "Best," the D2B table "ACCT_LOAN_DIM" references one or more data located in two D1 tables 610, "BEST_LS_BADCARPAYACCOUNTS," and "BEST_LS_LAWI_ACCTS." Additionally, there are no D2B tables 620 that reference the D2A table "ACCT_LOAN_DIM." There are no reports 625 that are generated based on data in the D1_TB_NM tables and the "ACCT_LOAN_DIM" table.

As another example, for the service "Acme," the D2A table "ACCT_LOAN_DIM," references one or more data in the D1 table ACME_LOAN_MASTER. One or more data in the D2A table "ACCT_LOAN_DIM" is referenced by several D2B tables 620 such as the D2B table "METRC_ACCT_VR_SL_TAT." A report 625 named "Vehicle Remarketing Daily Huddle SF" may be generated for the service "Acme" based on one or more original source data in the D1 table "ACME_LOAN_MASTER," one or more data in the D2A table "ACCT_LOAN_DIM," and one or more data in the D2B table "METRC_ACCT_VR_SL_TAT."

Figure 7:
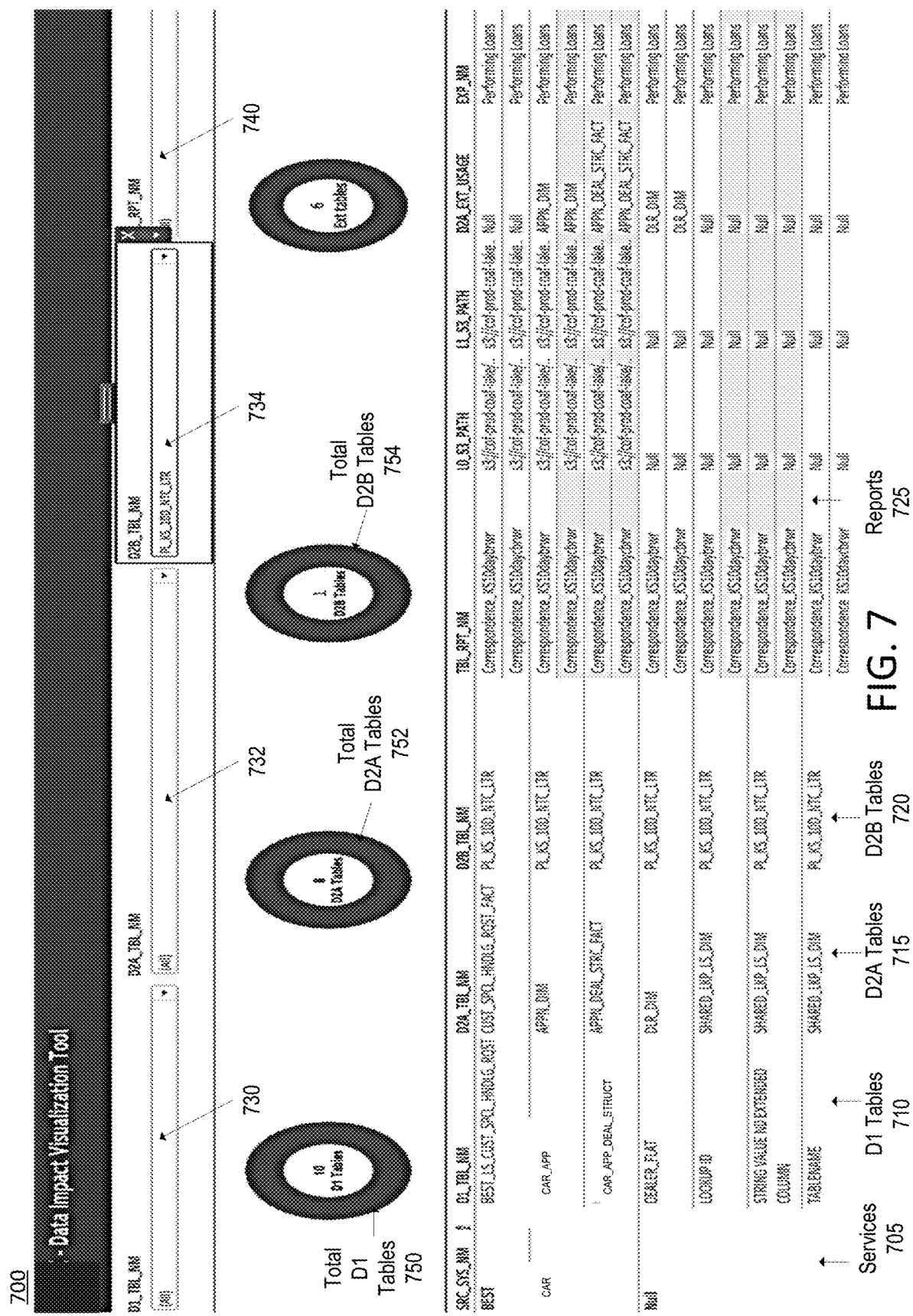
FIG. 7 shows another example of table level filtering.

FIG. 7 shows a result of table level filtering within a user interface 700. The user interface 700 shows a result of selecting a D2B table "PL_KS_10D_NTC_LTR," via the D2B_TBL_NM pull-down menu 734. The visualization of the services 705 displayed in the user interface 700 may be filtered based on the interrelationships between the selected D2B table "PL_KS_10D_NTC_LTR" and other data resources. For example, the services 705 may be updated to show the services that directly or indirectly reference one or more data in the D2B table "PL_KS_10D_NTC_LTR." The D1 tables 710 may be updated to show the names of tables that are directly or indirectly referenced by the D2B table "PL_KS_10D_NTC_LTR." The D2A tables 715 may be updated to show the names of D2A tables that are directly or indirectly referenced by the D2B table "PL_KS_10D_NTC_LTR." The reports 725 may be updated to show the names of reports that directly or indirectly reference one or more data in the D2B table "PL_KS_10D_NTC_LTR." For example, for the service "Best," the updated visualization in the user interface 700 shows that the D2B table "PL_KS_10D_NTC_LTR" may reference one or more data located in a D2A table "CUST_SPCL_HNDLG_RQST_FACT." Additionally, the D2A table "CUST_SPCL_HNDLG_RQST_FACT" may reference a D1 table "BEST_LS_CUST_SPCL_HNDLG_RQST." The updated reports 725 show two reports "Correspondence_KS10daybrwr" and "Correspondence_KS10daycbrwr" that may each generated based on one or more original source data in the D1 table "BEST_LS_CUST_SPCL_HNDLG_RQST," one or more data in the D2A table "CUST_SPCL_HNDLG_RQST_FACT," and one or more data in the D2B table "PL_KS10D_NTC_LTR."

Figure 8:
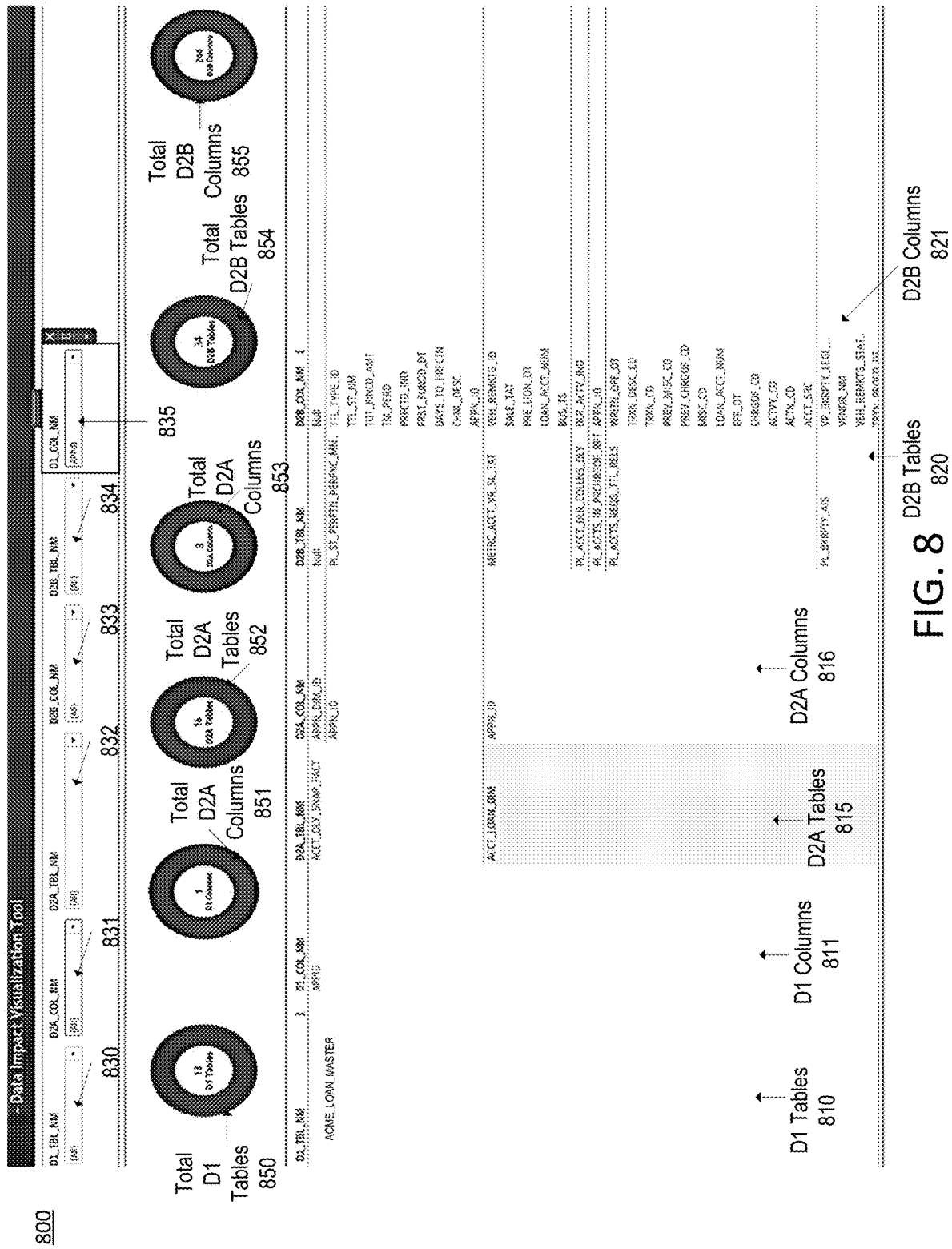
FIG. 8 shows an example of column level filtering in a user interface of the cascading data impact visualization tool.

FIG. 8 shows a result of column level filtering in a user interface 800. The visualization may also display the column names within the D1 tables 810, D2A tables 815, D2B tables 820, and reports 825. For example, the D1 columns 811 may indicate columns within the D1 tables 810, the D2A columns 816 may indicate columns within the D2A tables 815, and the D2B columns may indicate columns within the D2B tables 820. The user interface 800 may provide pull-down menus for selecting one or more of the D1 tables 810, D1 columns 811, D2A tables 815, D2A columns 816, D2B tables 820, D2B columns 821, and reports 825. For example, one of the D1 tables 810 may be selected via a D1_TB_NM pull-down menu 830, one of the D1 columns 811 may be selected via a D1_COL_NM pull-down menu 835, one of the D2A tables 815 may be selected via a D2A_TB_NM pull-down menu 832, one of the D2A columns 816 may be selected via a D2A_COL_NM pull-down menu 831, one of the D2B tables 820 may be selected via a D2A_TB_NM pull-down menu 834, one of the D2B columns 821 may be selected via a D2B_COL_NM pull-down menu 833 and one of the reports 825 may be selected via a TBL_RPT_NM pull-down menu (not shown).

The user interface 800 shows a result of selecting a D1 column "APPID," via the D1_COL_NM pull-down menu 835. The visualization of the services (not shown) displayed in the user interface 800 may be filtered based on the interrelationships between the selected D1 column "APPID" and other data resources. For example, the services may be updated to show the services that directly or indirectly reference one or more data in the D1 column "APPID." The D1 tables 810 may be updated to show the name of the table corresponding to the D1 column "APPID" such as "ACME_LOAN_MASTER." The D2A tables 815 may be updated to show the names of the D2A tables, such as "ACCT_DLY_SNAP FACT" and "ACCT_LOAN_DIM," that directly or indirectly reference one or more data in the D1 column "APPID" of the D1 table "ACME_LOAN_MASTER." The D2A columns 816 may be updated to indicate the specific columns in the D2A tables "ACCT_DLY_SNAP FACT" and "ACCT_LOAN_DIM" that directly or indirectly reference one or more data in the D1 column "APPID" of the D1 table "ACME_LOAN_MASTER." For example, the D2A columns 816 indicate that the columns "APPN_DIM_ID" and "APPN_ID" in the D2A table "ACCT_DLY_SNAP FACT" may reference data in the D1 column "APPID" of the D1 table "ACME_LOAN_MASTER." The D2B tables 820 may be updated to indicate the D2B tables that reference data in the updated D2A columns 816. For example, one or more data in the D2 columns "APPN_DIM_ID" and "APPN_ID" in the D2A table "ACCT_DLY_SNAP FACT" may be referenced by the D2B table "PL_ST_PERFTB_PERFNC_MN_." The D2B columns 821 may be updated to indicate the specific columns in the updated D2B tables 820. For example, the D2B columns 820 indicate that a column "TTL_TYPE_ID" in the D2B table "PL_ST_PERFTB_PERFNC_MN_" may reference one or more data in the D2A columns "APPN_DIM_ID" and "APPN_ID." Although not shown in the user interface 800, one or more reports generated based on data in the D1 column "APPID" may also be indicated.

Referring back to FIG. 3, the data impact application 325 that may be configured to determine an impact of a data change on one or more business applications and/or services. The data change may represent a proposed modification to a data resource associated with a business application or service, such as a change to the schema, data type, and/or attribute related to a table, column, and/or data element. The data change may represent an addition of a table, column, and/or data element. As an example, a single customer name column of a customer information table may include both the first and last names of the customers. A developer of a business application or service may wish to modify the customer information table so that the first name of a customer and the last name of the customer are located in two separate table columns, for example, a customer first name column and a customer last name column. Prior to implementing the modification, the developer may determine an impact of the modification on other data resources that may depend on the data to be modified (e.g., the customer name column) For example, a downstream data resource that references the customer name column may break when the customer name changes, if it is not updated to handle the first name of a customer and the last name of the customer in two separate table columns.

The data lineages for the customer name column may indicate other tables and/or reports that directly or indirectly reference the customer name column. The data impact visualization application 325 may, based on the data lineages, determine the dependencies on the customer name column. The dependencies may be determined based on utilizing the name of the customer information table as a primary key. The dependencies may indicate the reports, tables and/or data resources referencing the customer name column of the customer information table. Determining the dependencies may include post processing a target data resource, such as a report. The post processing may identify one or more data lineages of the customer name column based on the name of the customer information table as a primary key. For example, one of the data lineages of the customer name column may indicate that a customer address table relies on the customer name column of the customer information table. Another data lineage may indicate that a customer transactions table relies on the customer name column of the customer information table. Thus, both the customer address table and the customer transactions table may need to be updated to handle the proposed modification to the customer name column.

As another example of a data change, a customer of a business application and/or service, such as a business owner, may wish to change the maximum characters for a customer name from 50 to 70. A customer information table may include a customer name column. The data lineages of the customer information table may indicate that both a customer address table and/or a customer transactions table depend on the customer name column of the customer information table. Therefore, the data lineages may indicate the customer information table is a source for the customer address table and the customer transactions table. The data lineages of the customer information table may identify other table columns that depend on or reference the customer transactions table and the customer address table. Thus, prior to implementing the proposed modification, the maximum number of characters of a customer name column in the customer transactions table may need to be modified to support at least 70 characters. This improves the efficiency of modifying/updating databases to prevent errors, reduce downtime, and provide higher quality service for customers.

As another example, the data change may represent a corruption of one or more data, or unavailability of one or more data, such as a value in a table column that is referenced by other tables or data resources. For example, a modification to a table column or data element may result in a failure of a downstream tool that depends on the modified table column A support user may provide information related to the failure to the data impact application, for example, a report that shows an error. Based on the information related to the failure, a support user may utilize the data impact visualization application 325 to determine, for example, that the maximum number of characters in the customer name column may be a possible reason for the error or failure. The support user may visualize the data dependencies that may be related to the error and resolve the error based on identifying downstream resources that may need to be modified to handle the modified maximum number of characters in the customer name column. In this manner, the data impact visualization application 325 helps identify and correct database linking errors in a timely and more efficient manner thereby improving the speed and efficiency of linked databases.

Figure 9:
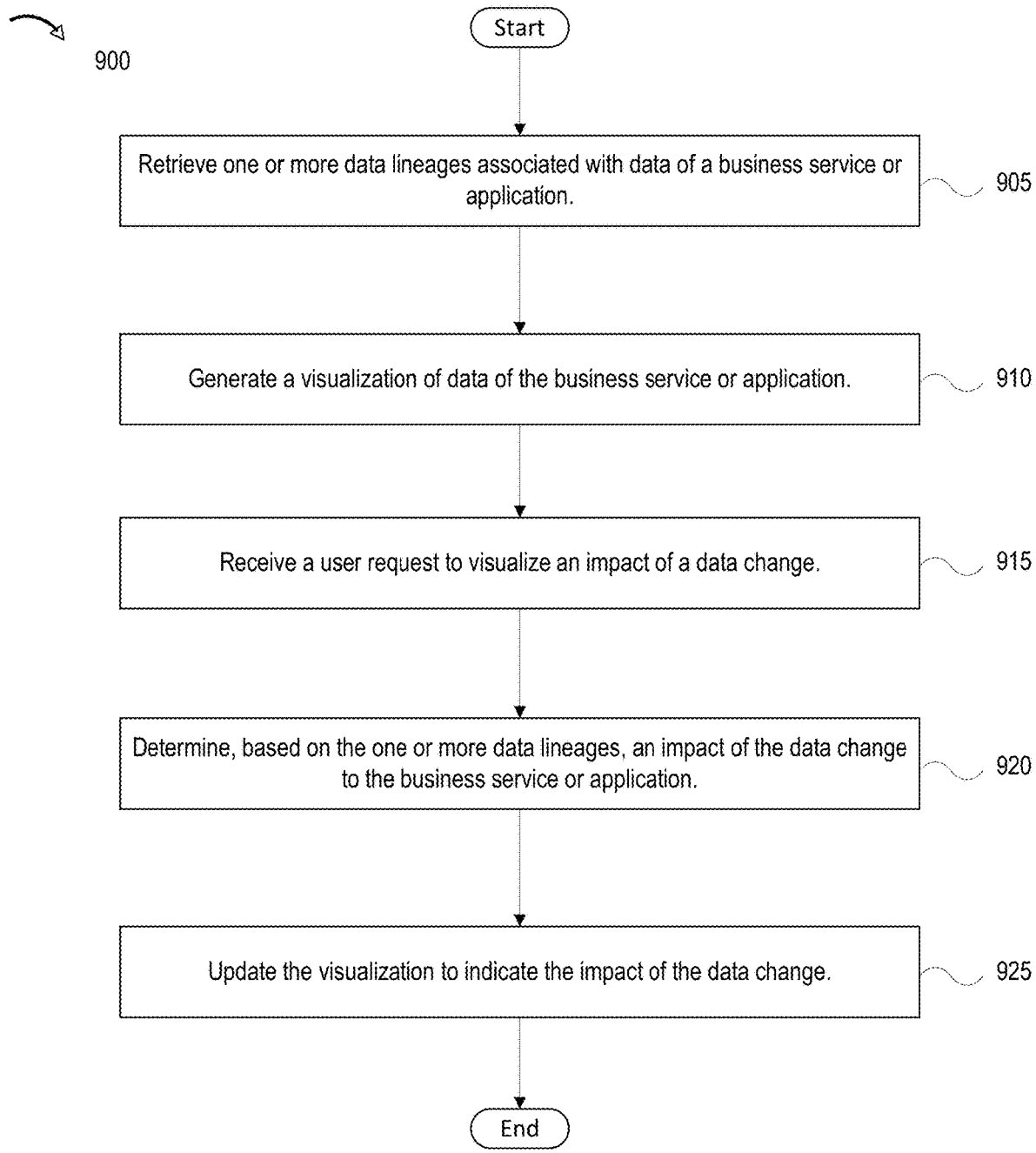
FIG. 9 shows a flow diagram of a process for determining and visualizing an impact of a data change.

FIG. 9 is a flow diagram of an example method 900 for determining and visualizing an impact of a data change. The steps of the method 900 may be performed by the data impact visualization application 325 shown in FIG. 3. Alternatively or additionally, some or all of the steps of the method 900 may be performed by one or more other computing devices. Steps of the method 900 may be modified, omitted, and/or performed in other orders, and/or other steps added.

A user, such as the user 345, may interact with a user interface provided by the data impact visualization application 325 and displayed on the client device 340 of the user 345. The user 345 may, within the user interface, select to display a visualization of a set of business applications and/or services provided by the applications 310. For example, the user selected set of services may include "Art," "Bus," "Birds," and "Best." At step 905, a server (e.g., the data impact visualization application 325 executing on server 305*b*) may, based on receiving a user request to display a visualization of the selected services "Art," "Bus," "Birds," and "Best," may retrieve one or more of the data lineages 330 that correspond to the data tables 315 and reports 320 associated with the selected services. The retrieved data lineages may comprise intermediate data lineages between one or more source data resources and one or more target data resources.

Figure 10A:
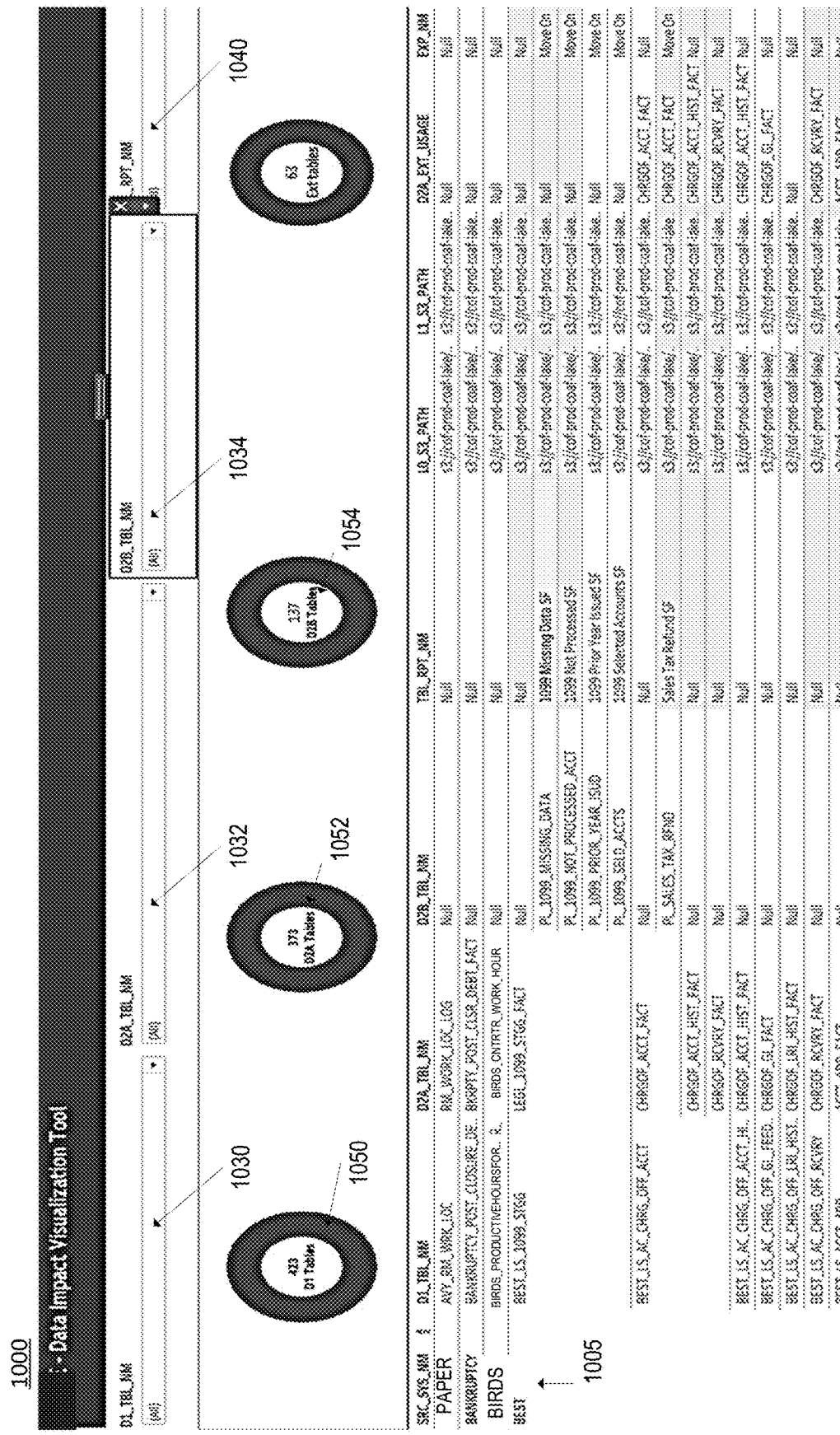
FIGS. 10A and 10B show an example of selecting a table in a user interface of the cascading data impact visualization tool.

At step 910, server (e.g., the data impact visualization application 325 executing on server 305*b*) may, based on the retrieved data lineages, generate a visualization of the data resources associated with the user selected services. FIG. 10A shows a visualization of the user selected services within a user interface 1000. As shown in FIG. 10A, the visualization may indicate the names of the one or more business applications and services (referred to as services 1005), such as "Art," "Bus," "Birds," and "Best." The visualization may indicate the data tables 315 and the reports 320 that are associated with each of the services 1005, such as the D1 tables 1010, the D2A tables 1015, the D2B tables 1020, and the reports 1025. The visualization may indicate the interrelationships between one or more source and target data resources associated with each of the services 1005. The target data resources may be reports, other tables and/or table columns.

As an example, the data resources associated with the service "Art" include a D1 table 1010 ART_RM_WRK_LOC and a D2A table 1015 RM_WORK_LOC_LOG. This indicates that that one or more original source data related to the service "Art" is located in ART_RM_WRK_LOC table and one or more data in the AVY_RM_WRK_LOC table is referenced by the D2A table 1015 RM_WORK_LOC_LOG. FIG. 10A shows that there are no D2B tables 1020 or reports 1025 associated with the service "Art." As another example, the data resources associated with the service "Best" include several D1 tables 1010 such as BEST_LS_1099_STGG, BEST_LS_AC_CHRG_OFF_ACCT, BEST_LS_AC_CHRG_OFF_ACCT_HI, BEST_LS_AC_CHRG_GL_FEED, BEST_LS_AC_CHRG_OFF_LRI_HIST, BEST_LS_AC_CHRG_OFF_RCVRY, BEST_LS_ACCT_ADR, and BEST_LS_ACCT_CHRG_OFF_GL_JR. One or more original source data in each of the D1 tables 1010 may be referenced by one or more of the D2A tables 1015 associated with the service "Best." For example, one or more original source data in the D1 table BEST_LS_1099_STGG may be referenced by a D2A table 1015 LEGL_1099_STGG_FACT. One or more original source data in another D1 table 1010 BEST_LS_AC_CHRG_OFF_ACCT may be referenced by three D2A tables such as CHRGOF_ACCT_FACT, CHRGOF_ACCT_HIST_FACT, and CHRGOF_RCVRY_FACT. One or more of the D2A tables 1015 may be referenced by one or more of the D2B tables 1020. For example, one or more data in the D2A table 1015 CHRGOF_ACCT_FACT may be referenced by the D2B table 1020 PL_SALES_TAX_RFND. One or more reports 1025 may be generated based on one or more data in the D2B tables 1020. For example, a report 1025 such as Sales Tax Refund SF may be generated based on the D2B table 1020 PL_SALES_TAX_RFND. Thus, for the service "Best", the visualization indicates a data lineage of the report Sales Tax Refund SF from the original source D1 table 1010 BEST_LS_AC_CHRG_OFF_ACCT to the destination Sales Tax Refund SF report 1025.

The user interface 1000 may provide pull-down menus for selecting one or more of the D1 tables 1010, the D2A tables 1015, the D2B tables 1020, and the reports 1025. For example, one of the D1 tables 1010 may be selected via a D1_TB_NM pull-down menu 1030, one of the D2A tables may be selected via a D2A_TB_NM pull-down menu 1032, one of the D2B tables may be selected via a D2B_TB_NM pull-down menu 1034, and one of the reports 1025 may be selected via a TBL_RPT_NM pull-down menu 1040.

The user interface 1000 may display various statistics related to the displayed visualization, such as a total number of the D1 tables 1010, the D2A tables 1015, the D2B tables 1020, and the reports 1025 associated with the displayed services 1005. For example, the user interface 1000 may comprise a first graphic 1050 indicating that there are 423 D1 tables 1010 associated with the services 1005. A second graphic 1052 may indicate that there are 373 D2A tables 1015 associated with the services 1005. A third graphic 1054 may indicate that there are 137 D2B tables 1020. The total number of the D1 tables 1010, the D2A tables 1015, the D2B tables 1020, and/or the reports 1025 associated with the displayed services 1005 may be updated based on changes to the displayed visualization. For example, filtering based on a table, column, or report name may update the visualization and thus, the number of data resources indicated by the three graphics 1050, 1052, and 1054.

Returning to FIG. 9, at step 915, the server (e.g., the data impact visualization application 325 executing on server 305b) may receive a user request to visualize, based on a user selection of a data resource, an impact to the user selected set of services. The user request may be based on a user selection of a D2B table "PL_KS_EARLY_PAYOFF_LTR" via the pull-down menu 1034 in FIG. 10A. The user selection of the D2B table "PL_KS_EARLY_PAYOFF_LTR" may represent a corruption of one or more data in the D2B table "PL_KS_EARLY_PAYOFF_LTR," unavailability of one or more data in the D2B table "PL_KS_EARLY_PAYOFF_LTR," and/or a proposed modification to one or more data in the D2B table "PL_KS_EARLY_PAYOFF_LTR".

At step 920, server (e.g., the data impact visualization application 325 executing on server 305b) may determine, based on the data lineages 330, one or more interrelationships between the D2B table "PL_KS_EARLY_PAYOFF_LTR" and other data resources associated with the services 1005. Based on the one or more interrelationships between the first data element and the other data resource, the server (e.g., the data impact visualization application 325 executing on server 305b) may determine one or more services and/or data elements affected by the change to the D2B table "PL_KS_EARLY_PAYOFF_LTR". At step 925, server (e.g., the data impact visualization application 325 executing on server 305b) may update, based on the one or more services and data elements that may be affected by the proposed change to the D2B table "PL_KS_EARLY_PAYOFF_LTR," the visualization displayed in the user interface 1000 shown in FIG. 10A.

Figure 10B:
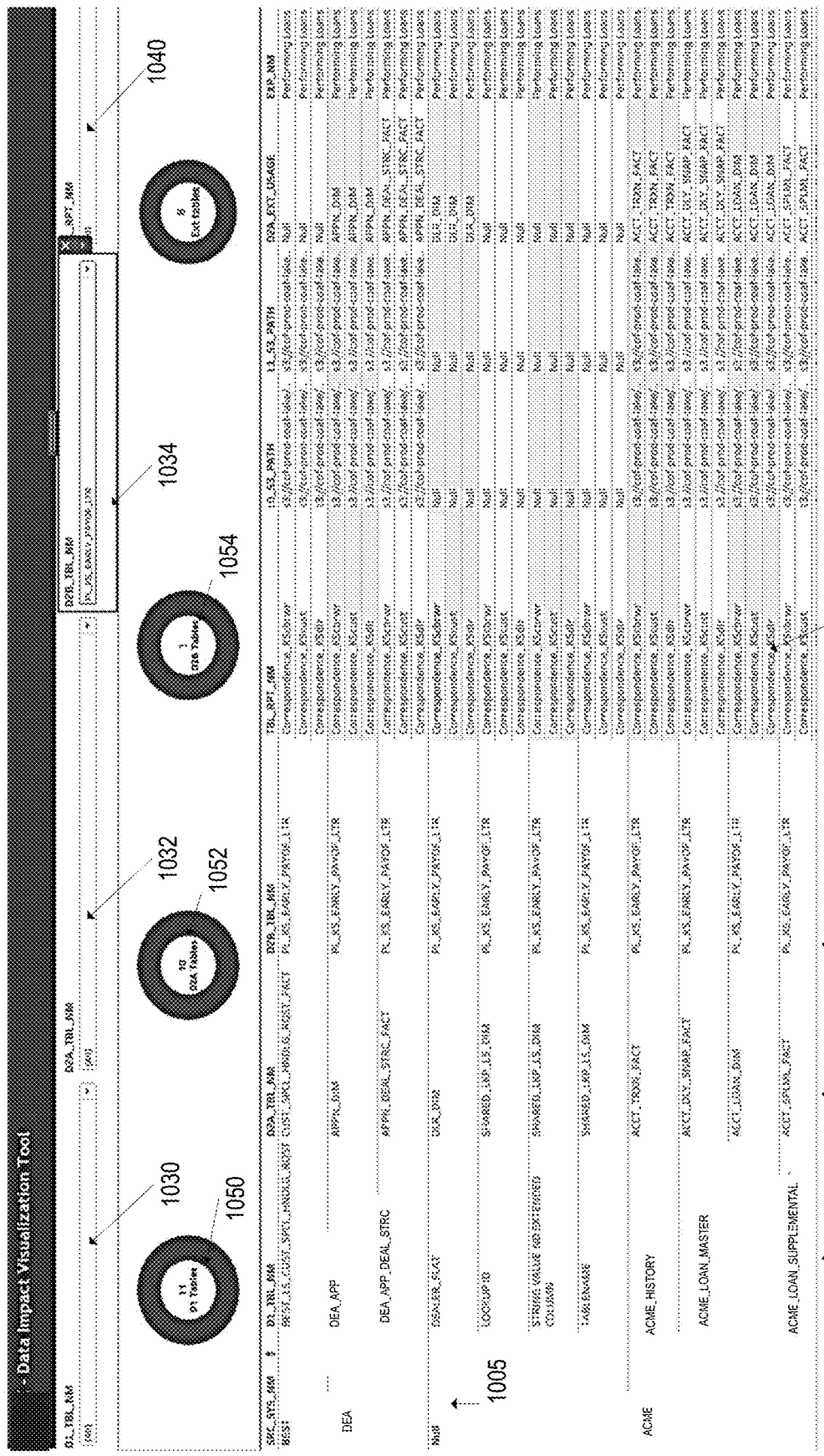

Turning to FIG. 10B, an example of an updated visualization displayed within a user interface 1001 after the selection of the D2B table "PL_KS_EARLY_PAYOFF_LTR" is shown. The updated visualization may identify the D1 tables 1010, the D2A tables 1015, the D2B tables 1020, and/or the reports 1025 that depend on or reference the D2B table "PL_KS_EARLY_PAYOFF_LTR." The updated visualization may include updates to the statistics, such as a total number of the D1 tables 1010, the D2A tables 1015, the D2B tables 1020, and/or the reports 1025 associated with the displayed services 1005. For example, the user interface 1000 may update the first graphic 1050 indicating that there are 11 D1 tables 1010 associated with updated visualization. The second graphic 1052 may be updated to indicate 10 D2A tables 1015. The third graphic 1054 may be updated to indicate 1 D2B table 1020.

Thus, prior to implementing a proposed modification to one or more data in the D2B table "PL_KS_EARLY_PAYOFF_LTR," some of the data resources identified in the updated visualization shown in FIG. 10B may need to be updated and/or modified to handle the proposed change to the D2B table "PL_KS_EARLY_PAYOFF_LTR." Otherwise, some of the downstream data resources that consume data related to the proposed change to the D2B table "PL_KS_EARLY_PAYOFF_LTR" may be negatively affected. In some implementations, the user interface provided by the data impact visualization application 325 may comprise an option to generate and send a notification to one or more users, for example the business users 360, associated with the data resources that may be affected by the proposed change to the D2B table "PL_KS_EARLY_PAYOFF_LTR."

Figure 11A:
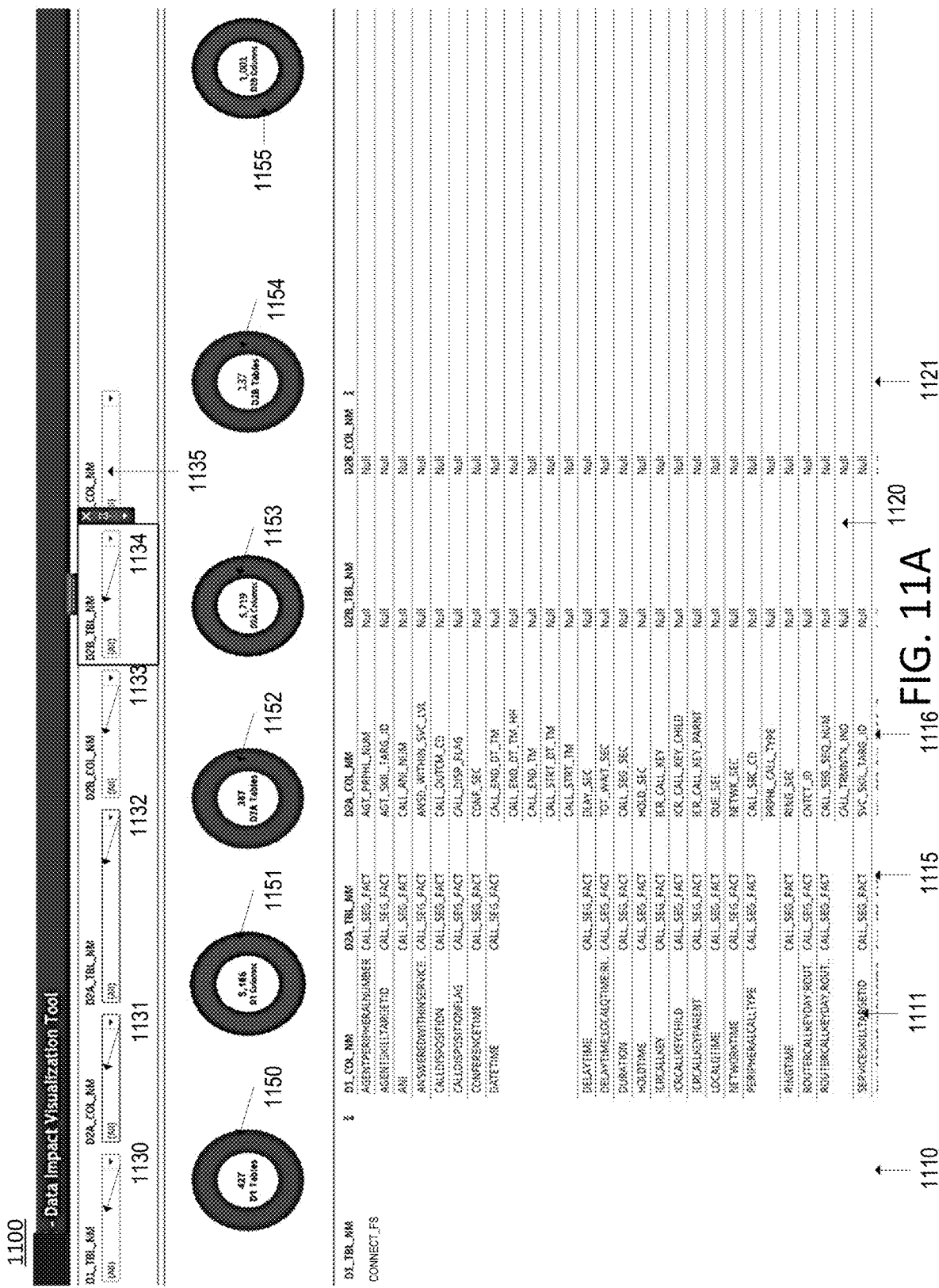
FIGS. 11A and 11B show an example of selecting a column in a user interface of the cascading data impact visualization tool.
Figure 11B:
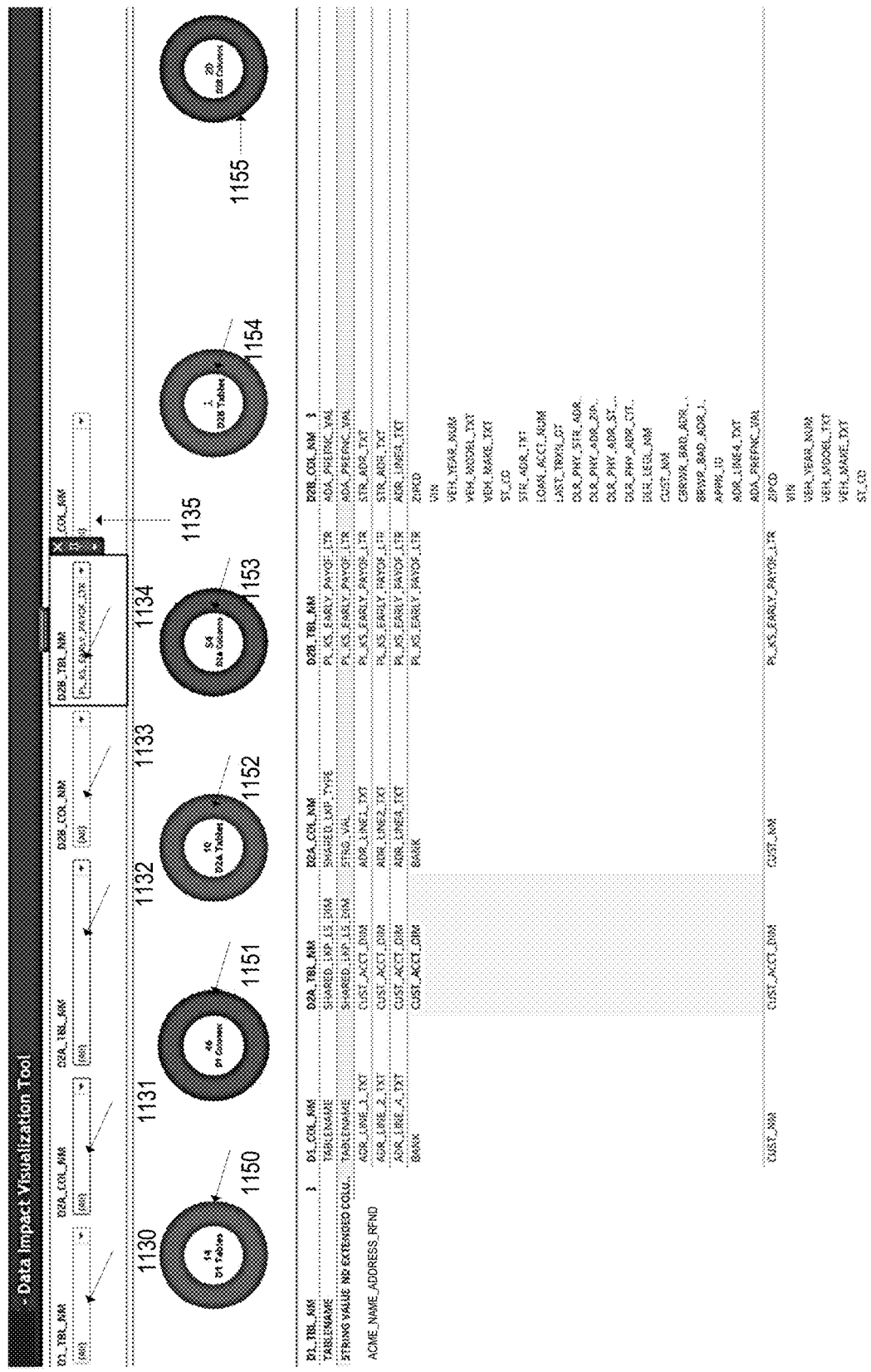

FIGS. 11A and 11B show another example of the data impact visualization application 325 determining and visualizing an impact of a data change according to the method 900 in FIG. 9. FIG. 11A shows a column level visualization of one or more services that may be provided by the data impact visualization application 325 within a user interface 1100. The visualization may display the names of D1 tables 1110, D1 columns 1111, D2A tables 1115, D2A columns 1116, D2B tables 1120, D2B columns 1121, and reports 1125. The user interface 1100 may provide pull-down menus for selecting one or more of the D1 tables 1110, D1 columns 1111, D2A tables 1115, D2A columns 1116, D2B tables 1120, D2B columns 1121, and reports 1125. For example, one of the D1 tables 1110 may be selected via a D1_TB_NM pull-down menu 1130, one of the D1 columns 1111 may be selected via a D1_COL_NM pull-down menu 1135, one of the D2A tables 1115 may be selected via a D2A_TB_NM pull-down menu 1132, one of the D2A columns 1116 may be selected via a D2A_COL_NM pull-down menu 1131, one of the D2B tables 1120 may be selected via a D2A_TB_NM pull-down menu 1134, one of the D2B columns 1121 may be selected via a D2B_COL_NM pull-down menu 1133 and one of the reports 1125 may be selected via a TBL_RPT_NM pull-down menu (not shown). The user interface 1100 may also provide multiple graphics 1150, 1151, 1152, 1153, 1154, and 1155 indicating a total number of D1 tables 1110, D1 columns 1111, D2A tables 1115, D2A columns 1116, D2B tables 1120, and D2B columns 1121. A D2B table 1120 "PL_KS_EARLY_PAYOF_LTR" may be selected via the pull-down menu 1134. FIG. 11B shows an updated visualization provided by the data impact visualization application 325 within the user interface 1100 based on the selection of the D2B table "PL_KS_EARLY_PAYOF_LTR."

Figure 12:
FIG. 12 shows an example of displaying statistics in a user interface of the cascading data impact visualization tool.

As discussed above, the user interface provided by the data impact visualization application may display various statistics for the data resources related to the displayed visualization, such as a total number of D1 tables, D2A tables, D2B tables, and reports. FIG. 12 shows a table level visualization comprising various statistics and displayed in a user interface 1200 after a selection of a D2A table "ACCT_LOAN_DIM." As shown in FIG. 12, the visualization may indicate the names of the one or more business applications and services (referred to as services 1205), such as "Art," "Bus," "Birds," and "Best." The visualization may indicate the data tables 315 and the reports 320 that are associated with each of the services 1205, such as the D1 tables 1210, the D2A tables 1215, the D2B tables 1220, and the reports 1025. The visualization may indicate the interrelationships between one or more source and target data resources associated with each of the services 1205. The target data resources may be reports, other tables and/or table columns. The user interface 1200 also includes pull-down menus 1230, 1232, 1234, and 1240 that are similar or equivalent to the pull-down menus 1030, 1032, 1034, and 1040 shown in the user interface 1000 in FIG. 10A.

The user interface 1200 may comprise a first graphic 1250 indicating a total number of D1 tables 1210 associated with the displayed visualization after the selection of the D2A table "ACCT_LOAN_DIM." The user interface 1200 may comprise a second graphic 1252 indicating a total number of D2A tables 1210 associated with the displayed visualization after the selection of the D2A table 1215 "ACCT_LOAN_DIM." The user interface 1200 may comprise a third graphic 1254 indicating a total number of D2B tables 1220 associated with the displayed visualization after the selection of the D2A table 1215 "ACCT_LOAN_DIM."

Figure 13:
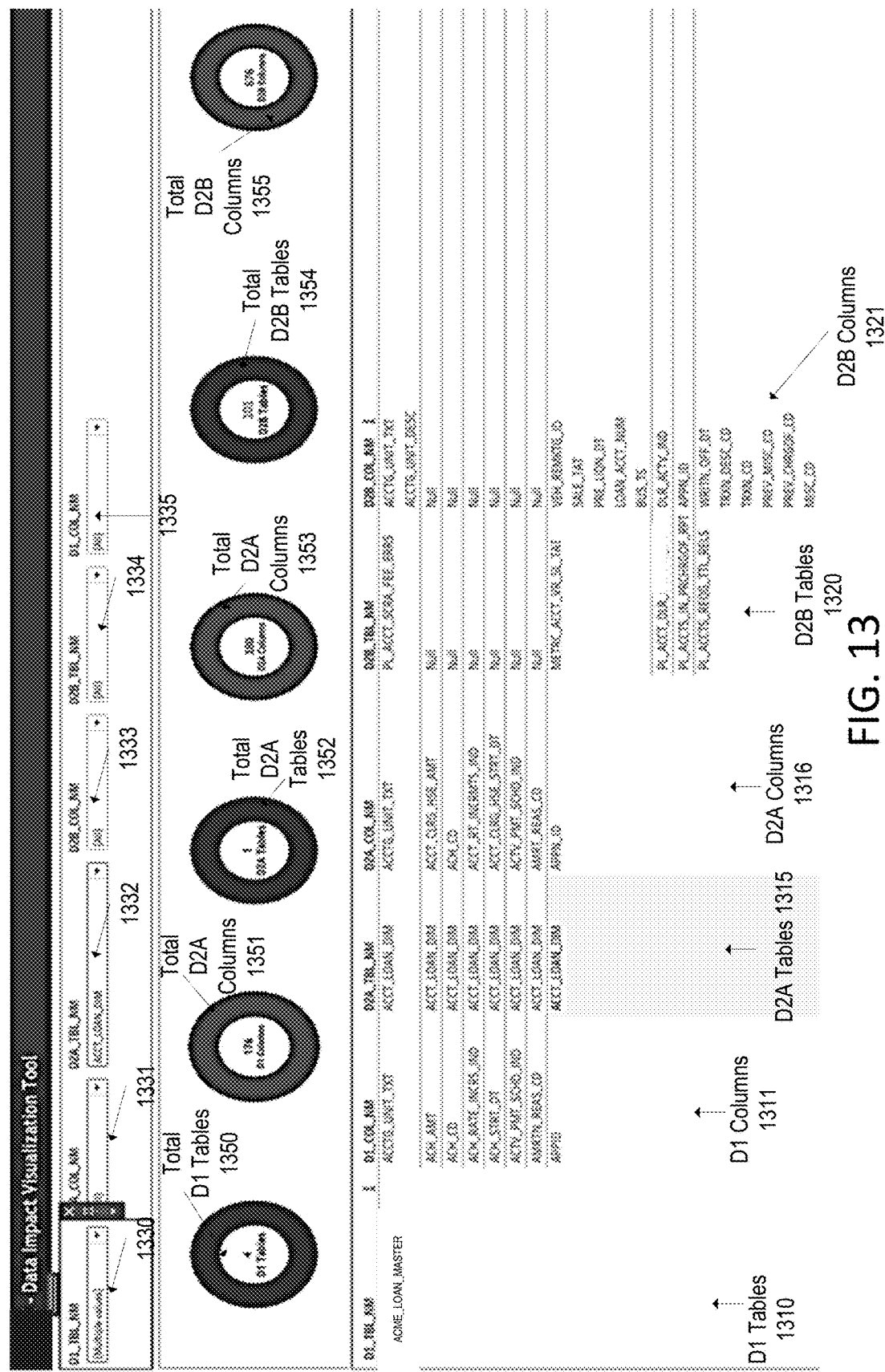
FIG. 13 shows an example of determining and visualizing an impact of a data change in a user interface of the cascading data impact visualization tool.

FIG. 13 shows a column level visualization comprising various statistics and displayed in a user interface 1300 after a selection of a D2A table "ACCT_LOAN_DIM." The visualization may display the names of D1 tables 1310, D1 columns 1311, D2A tables 1315, D2A columns 1316, D2B tables 1320, D2B columns 1321, and reports 1325. The user interface 1300 may provide pull-down menus 1350, 1351, 1352, 1353, 1354, and 1355 for selecting one or more of the respective D1 tables 1310, D1 columns 1311, D2A tables 1315, D2A columns 1316, D2B tables 1320, and D2B columns 1321. The user interface 1300 may comprise a first graphic 1350 indicating a total number of D1 tables 1310 associated with the displayed visualization after the selection of the D2A table 1315 "ACCT_LOAN_DIM." The user interface 1300 may comprise a second graphic 1351 indicating a total number of D1 columns 1311 associated with the displayed visualization after the selection of the D2A table 1315 "ACCT_LOAN_DIM." The user interface 1300 may comprise a third graphic 1352 indicating a total number of D2A tables 1315 associated with the displayed visualization after the selection of the D2A table 1315 "ACCT_LOAN_DIM." The user interface 1300 may comprise a fourth graphic 1353 indicating a total number of D2A columns 1316 associated with the displayed visualization after the selection of the D2A table 1315 "ACCT_LOAN_DIM." The user interface 1300 may comprise a fifth graphic 1354 indicating a total number of D2B tables 1320 associated with the displayed visualization after the selection of the D2A table 1315 "ACCT_LOAN_DIM." The user interface 1300 may comprise a sixth graphic 1355 indicating a total number of D2B columns 1321 associated with the displayed visualization after the selection of the D2A table 1315 "ACCT_LOAN_DIM."

In some implementations, the user interface provided by the data impact visualization application 325 may provide statistics related to queries (filtering), usage, and modifications of the data resources. For example, the data impact visualization application 325 may determine a number of users querying a data resource, such as a table or report. The querying may be performed by the business customers or users of a business application or service. The querying may be performed by other applications 310 or third party applications. The data impact visualization application 325 may determine a length of time for each query. As an example, the data for a table may indicate that a query related to this table may be 200 ms because of the dependencies between that table and other tables or reports. Based on the number of users, the length of time of each query, and a threshold for a maximum amount of time set for a type of query, the dependencies between data resources may be identified for optimization thereby, reducing cost and improving the overall efficiency of the database. In some implementations, a machine learning algorithm may be trained on the statistics provided by the data impact visualization application 325 in order to determine recommendations and to discover previously unknown insights and patterns.

Figure 15:
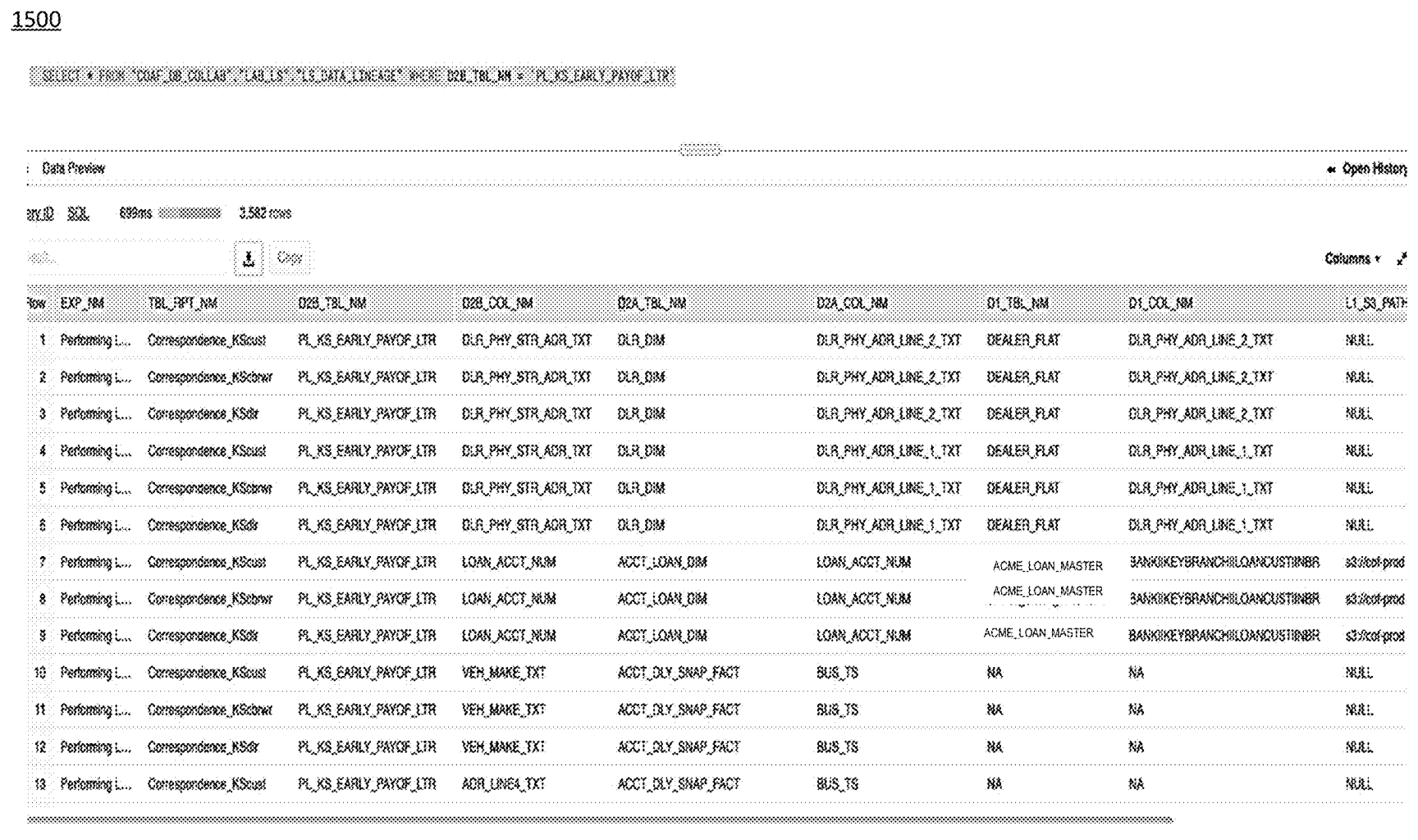

As discussed above, one or more data lineages may be determined for the data resources, such as the data tables 315 and the reports 320, associated with the business applications and services provided by the applications 310. The data lineages are based on the interrelationships among the data resources. For example, one or more of the data tables 315 may be related by specific fields (table columns). Additionally, one or more reports 320 may be generated based on one or more of the data tables 315. The data lineages 315 for the data resources associated with a service may be generated based on specifying one or more of the data resources that comprise original source data and one or more of the target data resources. FIG. 14 shows an example of a data lineage document 1400 specifying a plurality of original source data resources and a plurality of target data resources. FIG. 15 shows an example view 1500, of data lineages based on processing one or more data lineage documents, such as the data lineage document 1400 shown in FIG. 14. FIG. 16 shows another example view 1600 of data lineages generated based on processing one or more data lineage documents, such as the data lineage document shown in FIG. 14 NG. 17 shows an example routine for that may be utilized for generating a data lineage based on information in a data lineage document.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   identifying, based on one or more statistics associated with a plurality of data resources, a plurality of interrelationships between a plurality of data resources by determining one or more interdependencies between a first data resource of the plurality of data resources and a second data resource of the plurality of data resources, wherein the plurality of data resources is associated with a computing system;
   outputting, at a display device and based on the plurality of interrelationships between the plurality of data resources, a visualization of the computing system, wherein the plurality of data resources comprises:
      a data source, at a first database level, having a structural configuration and storing data based on the structural configuration; and
      a data consumer at a second database level that is different than the first database level;
   detecting a change to the data source, wherein the change to the data source comprises a change to the structural configuration of the data source;
   determining, based on the plurality of interrelationships, a flow of data from the data source to the data consumer, wherein the flow of data indicates that the data consumer is affected by the change to the data source; and
   outputting, at the display device and based on the flow of data, an updated visualization of the computing system, wherein the updated visualization comprises:
      an indication of an impact, to the computing system, of the change to the data source;
      an identifier of the data source; and
      an identifier of the data consumer, and
   wherein the one or more statistics comprise one or more of:
      a number of users of one or more of the first data resource or the second data resource;
      a latency of a query associated with one or more of the first data resource or the second data resource; or
      a maximum threshold latency associated with a type of a query associated with one or more of the first data resource or the second data resource.

2. The computer-implemented method of claim 1, wherein:
   the detecting the change to the data source further comprises detecting a change to one or more values of the data stored at the data source; and
   the indication of the impact of the change to the data source comprises an indication of an impact, to the data consumer, of the change to the one or more values of the data.

3. The computer-implemented method of claim 1, wherein:
   the change to the data source is a proposed change; and
   the outputting the updated visualization of the computing system occurs before the proposed change to the data source occurs.

4. The computer-implemented method of claim 1, wherein:
   the structural configuration of the data source comprises a configuration of a column of a table of a database; and
   the data consumer references the column.

5. The computer-implemented method of claim 1, further comprising receiving a request to visualize an impact, to the computing system, of the change to the data source, and wherein the outputting of the updated visualization of the computing system is further based on the request.

6. The computer-implemented method of claim 1, wherein a first database comprises the first database level and a second database comprises the second database level.

7. The computer-implemented method of claim 1, further comprising:
   retrieving a data lineage that indicates the plurality of interrelationships between the plurality of data resources; and determining, based on the data lineage, one or more interrelationships between the data source and the data consumer, wherein the determining the flow of data from the data source to the data consumer is further based on the one or more interrelationships between the data source and the data consumer.

8. An apparatus comprising:
one or more processors; and
memory storing instructions that, when executed by the one or more processors, cause the apparatus to:
identify, based on one or more statistics associated with a plurality of data resources, a plurality of interrelationships between a plurality of data resources by determining one or more interdependencies between a first data resource of the plurality of data resources and a second data resource of the plurality of data resources, wherein the plurality of data resources is associated with a computing system;
output, at a display device and based on the plurality of interrelationships between the plurality of data resources, a visualization of the computing system, wherein the plurality of data resources comprises:
a data source, at a first database level, having a structural configuration and storing data based on the structural configuration; and
a data consumer at a second database level that is different than the first database level;
detect a change to the data source, wherein the change to the data source comprises a change to the structural configuration of the data source;
determine, based on the plurality of interrelationships, a flow of data from the data source to the data consumer, wherein the flow of data indicates that the data consumer is affected by the change to the data source; and
output, at the display device and based on the flow of data, an updated visualization of the computing system,
wherein the updated visualization comprises:
an indication of an impact, to the computing system, of the change to the data source;
an identifier of the data source; and
an identifier of the data consumer; and
wherein the one or more statistics comprise one or more of:
a number of users of one or more of the first data resource or the second data resource;
a latency of a query associated with one or more of the first data resource or the second data resource; or
a maximum threshold latency associated with a type of a query associated with one or more of the first data resource or the second data resource.

9. The apparatus of claim 8, wherein the instructions, when executed by the one or more processors, further cause the apparatus to:
retrieve a data lineage that indicates the plurality of interrelationships between the plurality of data resources, wherein the data lineage comprises one or more of:
an indication of a dependency, of the data consumer, on the data source;
an indication of a relationship between a first database table of the data source and a second database table of the data consumer;
an indication of a relationship between a first column of a first database table of the data source and a second column of a second database table of the data consumer; or
an indication of the first database level and the second database level;
determine, based on the data lineage, one or more interrelationships between the data source and the data consumer; and
determine the flow of data from the data source to the data consumer further based on the one or more interrelationships between the data source and the data consumer.

10. The apparatus of claim 8, wherein the data consumer comprises one or more of:
a report;
a column of a database table;
a database table;
a database;
a software application; or
a software service.

11. The apparatus of claim 8, wherein detecting a change to the data source further comprises detecting one or more of:
a corruption associated with the data source; or
an unavailability of at least a portion of the data source.

12. The apparatus of claim 8, wherein the instructions, when executed by the one or more processors, further cause the apparatus to output, at the display device, an interactive user interface comprising:
the visualization of the computing system;
one or more user interface control elements configured to select one or more data resources of the plurality of data resources; and
one or more statistics associated with the one or more selected data resources.

13. The apparatus of claim 8, wherein:
the instructions, when executed by the one or more processors, further cause the apparatus to output, at the display device, one or more statistics associated with one or more data resources of the plurality of data resources; and
the one or more statistics comprise one or more of:
an indication of a number of queries associated with a data resource of the one or more data resources;
a latency of a query associated with a data resource of the one or more data resources;
an indication of an amount of use of a data resource of the one or more data resources;
an indication of one or more modifications associated with a data resource of the one or more data resources; or
an indication of a total number of a type of data resource of the one or more data resources.

14. A non-transitory machine-readable medium storing instructions that, when executed by one or more processors, cause the one or more processors to perform steps comprising:
identifying, based on one or more statistics associated with a plurality of data resources, a plurality of interrelationships between a plurality of data resources by determining one or more interdependencies between a first data resource of the plurality of data resources and a second data resource of the plurality of data resources, wherein the plurality of data resources is associated with a computing system;

outputting, at a display device and based on the plurality of interrelationships between the plurality of data resources, a visualization of the computing system, wherein the plurality of data resources comprises:
  a data source, at a first database level, having a structural configuration and storing data based on the structural configuration; and
  a data consumer at a second database level that is different than the first database level;
detecting a change to the data source, wherein the change to the data source comprises a change to the structural configuration of the data source;
determining, based on the plurality of interrelationships, a flow of data from the data source to the data consumer, wherein the flow of data indicates that the data consumer is affected by the change to the data source; and
outputting, at the display device and based on the flow of data, an updated visualization of the computing system, wherein the updated visualization comprises:
  an indication of an impact, to the computing system, of the change to the data source;
  an identifier of the data source; and
  an identifier of the data consumer, and
wherein the one or more statistics comprise one or more of:
  a number of users of one or more of the first data resource or the second data resource;
  a latency of a query associated with one or more of the first data resource or the second data resource; or
  a maximum threshold latency associated with a type of a query associated with one or more of the first data resource or the second data resource.

15. The non-transitory machine-readable medium of claim 14, wherein the instructions, when executed by one or more processors, cause the one or more processors to perform steps further comprising providing one or more statistics associated with one or more data resources of the plurality of data resources.

16. The non-transitory machine-readable medium of claim 14, wherein the instructions, when executed by one or more processors, cause the one or more processors to perform steps further comprising:
  training, using one or more statistics associated with one or more data resources of the plurality of data resources, a machine learning algorithm; and
  determining, using the machine learning algorithm, one or more patterns associated with the plurality of data resources.

17. The non-transitory machine-readable medium of claim 14, wherein the instructions, when executed by one or more processors, cause the one or more processors to perform steps further comprising sending a notification indicating the impact of the change to the data source.

18. The non-transitory machine-readable medium of claim 14, wherein the instructions, when executed by one or more processors, cause the one or more processors to perform steps further comprising sending a notification comprising an indication of one or more data resources of the plurality of data resources that are impacted by the change to the data source.

19. The non-transitory machine-readable medium of claim 14, wherein:
  the instructions, when executed by one or more processors, cause the one or more processors to perform steps further comprising:
    retrieving a data lineage that indicates the plurality of interrelationships between the plurality of data resources, wherein the data lineage comprises one or more of:
      an indication of the flow of data, at a database column level, from the data source to the data consumer; or
      an indication of the flow of data, at a database table level, from the data source to the data consumer;
    determining, based on the data lineage, one or more interrelationships between the data source and the data consumer; and
    the flow of data from the data source to the data consumer is further based on the one or more interrelationships between the data source and the data consumer.

20. The non-transitory machine-readable medium of claim 14, wherein:
  the instructions, when executed by one or more processors, cause the one or more processors to perform steps further comprising:
    output, at the display device, statistics associated with one or more data resources of the plurality of data resources, wherein the one or more statistics comprise one or more of:
      an indication of a number of queries associated with a data resource of the one or more data resources;
      an indication of an amount of use of a data resource of the one or more data resources;
      an indication of one or more modifications associated with a data resource of the one or more data resources; or
      an indication of a total number of a type of data resource of the one or more data resources.

* * * * *